(12) United States Patent
Miyaguchi et al.

(10) Patent No.: US 7,146,869 B2
(45) Date of Patent: *Dec. 12, 2006

(54) BALL SCREW DEVICE AND LINEAR MOTION DEVICE

(75) Inventors: Kazuo Miyaguchi, Maebashi (JP); Tsutomu Ohkubo, Maebashi (JP); Takeshi Nakazawa, Maebashi (JP); Shirouji Yabe, Maebashi (JP); Soichiro Kato, Maebashi (JP); Nobumitsu Takahashi, Maebashi (JP); Ryouichi Sato, Maebashi (JP); Hiroki Yamaguchi, Maebashi (JP); Yoshinori Mizumura, Maebashi (JP)

(73) Assignee: NSK Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/960,089

(22) Filed: Oct. 8, 2004

(65) Prior Publication Data

US 2005/0076734 A1    Apr. 14, 2005

Related U.S. Application Data

(60) Division of application No. 10/283,307, filed on Oct. 30, 2002, now Pat. No. 6,813,968, which is a division of application No. 10/038,660, filed on Jan. 8, 2002, now Pat. No. 6,805,019, which is a continuation of application No. 09/317,978, filed on May 25, 1999, now Pat. No. 6,347,558.

(30) Foreign Application Priority Data

| Jun. 2, 1998 | (JP) | ................................ 10-167813 |
| Aug. 12, 1998 | (JP) | ................................ 10-239458 |
| Feb. 3, 1999 | (JP) | ................................ 11-026544 |

(51) Int. Cl.
| F16H 3/06 | (2006.01) |
| F16H 27/02 | (2006.01) |
| F16H 29/02 | (2006.01) |
| F16H 29/20 | (2006.01) |
| F16C 19/20 | (2006.01) |

(52) U.S. Cl. .................... 74/89.32; 74/89.33; 384/521
(58) Field of Classification Search .................... 74/89, 74/89.23, 89.32, 89.33; 384/520–522
See application file for complete search history.

(56) References Cited

U.S. PATENT DOCUMENTS

| 1,405,894 | A | 2/1922 | Borg | ........................... 384/520 |
| 2,350,538 | A | 6/1944 | Selnes | ........................ 74/459 |
| 2,844,044 | A | 7/1958 | Cole | ........................... 74/424.8 |
| 2,897,021 | A | 7/1959 | Zeilman | ..................... 384/520 |
| 3,208,806 | A | 9/1965 | Grolmann et al. | ........... 384/520 |
| 3,292,981 | A | 12/1966 | Zaugg | ........................ 308/201 |
| 4,277,117 | A | 7/1981 | George | ....................... 384/520 |
| 4,761,820 | A | 8/1988 | Frank et al. | ................. 384/520 |
| 5,241,874 | A | 9/1993 | Matsuhama | ................. 74/424.8 |
| 5,597,243 | A | 1/1997 | Kaiser et al. | ............... 384/551 |
| 5,927,858 | A | 7/1999 | Agari | ........................... 384/45 |
| 5,947,605 | A | 9/1999 | Shirai | .......................... 384/45 |

(Continued)

FOREIGN PATENT DOCUMENTS

DE        2627025        12/1977

(Continued)

Primary Examiner—Tisha Lewis
(74) Attorney, Agent, or Firm—Miles & Stockbridge PC

(57) ABSTRACT

A spacer between adjacent balls of, for example, a ball screw device or a linear motion device has an outer periphery that is concave such that the spacer is elastically deformed to be in substantially circular line contact with the adjacent balls and that a distance therebetween is variable.

4 Claims, 20 Drawing Sheets

U.S. PATENT DOCUMENTS

| | | | |
|---|---|---|---|
| 6,095,009 A | 8/2000 | Takagi | 74/459 |
| 6,113,274 A | 9/2000 | Horimoto | 384/43 |
| 6,347,558 B1 | 2/2002 | Miyaguchi et al. | 384/43 |
| 6,352,367 B1 | 3/2002 | Konomoto et al. | 384/45 |
| 6,513,978 B1 | 2/2003 | Shirai et al. | 384/45 |
| 6,805,019 B1 | 10/2004 | Miyaguchi et al. | 74/424 |
| 6,813,968 B1 | 11/2004 | Miyaguchi et al. | 74/424 |
| 2001/0026651 A1 | 10/2001 | Michioka | |
| 2003/0039414 A1 | 2/2003 | Niwa | |

FOREIGN PATENT DOCUMENTS

| | | |
|---|---|---|
| DE | 28 38 329 | 3/1980 |
| JP | 40-24405 | 10/1940 |
| JP | 46-12571 | 5/1971 |
| JP | 54-153962 | 12/1979 |
| JP | 56-116951 | 9/1981 |
| JP | 57-101158 | 6/1982 |
| JP | 62-118116 | 5/1987 |
| JP | 1-113657 | 7/1989 |
| JP | 1-169118 | 7/1989 |
| JP | 4-27405 | 5/1992 |
| JP | 5-126148 | 5/1993 |
| JP | 6-173946 | 6/1994 |
| WO | 01/25647 | 4/2001 |

GOTHIC ARCH

BALL SCREW DEVICE AND LINEAR MOTION DEVICE

CROSS-REFERENCE TO RELATED APPLICATIONS

This application is a division of application Ser. No. 10/283,307 filed Oct. 30, 2002 (now U.S. Pat. No. 6,813, 968), which is a division of application Ser. No. 10/038,660 filed Jan. 8, 2002 (now U.S. Pat. No. 6,805,019), which is a continuation of application Ser. No. 09/317,978 filed May 25, 1999 (now U.S. Pat. No. 6,347,558).

This application claims the benefits of Japanese Application Nos. 10-167813, 10-239458 and 11-026544 which are hereby incorporated by reference.

BACKGROUND OF THE INVENTION

1. Field of the Invention

The present invention relates to a ball screw device and a linear motion device which do not induce decreases in load capacity and in rigidity with a restraint of reduction in the number of load balls even when spacers are disposed between the load balls, which enhance a circulative characteristic of the spacers by minimizing friction between the load balls and the spacers, and which prevent a deterioration of operability, an occurrence of noises and deteriorated quality of a sound produced, and frictional damage to the balls.

2. Related Background Art

In the ball screw device, as shown in FIG. 33, helical screw grooves 3, 4 corresponding to each other are formed in an outer peripheral surface of a screw shaft 1 and in an inner peripheral surface of a nut 2. A multiplicity of balls 5 are so disposed as to be capable of rolling in a helical circulation path defined by the two screw grooves 3, 4. When one of the screw shaft 1 and the nut 2 is moved in the axial direction by relatively rotating the screw shaft 1 and the nut 2, the screw shaft 1 and the nut 2 make smooth helical motions through rolling of the multiplicity of balls 5.

In the thus constructed ball screw device, the balls 5 are densely disposed within the screw grooves 3, 4 and roll in the same direction in the individual screw grooves 3, 4. On this occasion, however, at a contact point between the balls adjacent to each other, the balls 5 rolling in the directions opposite to each other come into contact with each other enough to mutually hinder the rolling thereof. As a result, there might arise a variety of problems in which free rolling of the balls 5 is thus hindered, an operability of the balls 5 is deteriorated, frictional damage to the balls 5 is induced, a torque fluctuates, and noises increase.

To cope with these problems, Japanese Patent Application Laid-Open Publication No. 56-116951 discloses a construction wherein an elastic member for making the balls spaced away from each other is disposed between the balls receiving a load, and an annular member making a circulative movement together with the balls is loosely fitted to the outside of the elastic member. Japanese Patent Application Laid-Open Publication No. 57-101158 discloses such a construction that a shim is retained between the adjacent balls and serves to prevent a rolling friction between the balls.

Further, Japanese Utility Model Application Laid-Open Publication No. 1-113657 discloses a construction in which a spacer ball 6 formed from a resin is, as illustrated in FIG. 34, interposed between the balls 5 receiving the load, thereby preventing the impingement of the balls on each other and restraining an occurrence of noises.

Incidentally, what is similar to the ball screw device described above may be exemplified by a linear guide constructed of a guide rail extending in the axial direction, a slider provided astride of this guide rail, and balls serving as rolling members and interposed between the guide rail and the slider. The above-mentioned ball screw device and linear guide are generically referred to as a linear motion device in the present specification. The linear motion device is defined as being constructed of an outer member, an inner member facing to this outer member through a gap, a multiplicity of balls disposed between the outer and inner members, and spacers interposed between those balls.

For example, in the case of the linear guide, the slider having substantially U-shape section is mounted astride of the guide rail having an angular bar-like shape, track grooves are formed respectively in an outer surface of the guide rail and in an inner surface of the slider which faces thereto, and the multiplicity of balls as the rolling members are loaded in the track grooves, whereby the slider and the guide rail make relative linear motions with the aid of the rolling members circulated while rolling. In the case of this type of linear guide, the slider is defined as the outer member, while the guide rail is defined as the inner member. On the other hand, another type of linear guide has such a construction that an angular slider is accommodated in a recessed portion of the guide rail taking substantially the U-shape in section, and the balls are loaded in the track grooves formed respectively in the inner surface of the guide rail and in the outer surface of the slider which faces thereto. In this case, the guide member is defined as the outer member, while the slider is inner member.

Further, in the ball screw device, as described above, the screw shaft, of which the outer surface is formed with the helical screw groove, is inserted into the nut with its inner surface formed with the helical screw groove, and the multiplicity of balls are loaded in the two screw grooves facing to each other. With these balls making the rolling circulation, the nut and the screw shaft perform their relative rotational and linear motions. Accordingly, in the case of the ball screw device, the nut is defined as the outer member, while the screw shaft is defined as the inner member.

To summarize, the outer member of the linear motion device indicates the slider or the guide rail in the case of the linear guide, and indicates the nut in the case of the ball screw device. The inner member indicates the guide rail or the slider in the case of the linear guide, and indicates the screw shaft in the case of the ball screw device.

An example of the above linear motion device using a spacer is disclosed in Japanese Patent Application Laid-Open Publication No. 5-126148, wherein as shown in FIG. 35 a spacer 7 having two concave surfaces 6, 6 contiguous respectively to balls 5, 5 is disposed between the balls 5, 5 adjacent to each other. Further, as for a bearing, Japanese Patent Application Laid-Open Publication No. 62-118116 discloses a structure that as shown in FIG. 36 a hollowed pipe-like spacer 8 is disposed between the adjacent balls 5, 5. The spacer 8 is formed by cutting off to a predetermined dimension a steel pipe of which a diameter is smaller than a diameter of the ball 5. Further, as disclosed in Japanese Patent Application Post-Exam Publication No. 40-24405, a partition member disposed between the adjacent balls has two spherical concave portions each facing to a ball, a radius of which is slightly larger than a radius of the ball.

A through-hole formed at the center of the spherical concave portion of the partition member is used as a reservoir of lubricating oil.

A problem inherent in only the ball screw device described above is that the spacer, such as the elastic member, the annular member and the shim etc, is provided in each of the ball screw devices disclosed in Japanese Patent Application Laid-Open Publication Nos. 56-116951 and 57-101158, and therefore the number of the balls receiving the load is reduced, with the result that a load capacity and a rigidity of the ball screw device decrease.

Additionally, the spacer, such as the elastic member, the annular member and the shim etc, induces an impingement upon the screw groove enough to cause a skew (from a proper posture) of the spacer, resulting in a decline of a circulative characteristic of the spacer.

In the ball screw device disclosed in Japanese Utility Model Application Laid-Open Publication No. 1-113657, as shown in FIG. 34, the number of the balls receiving the load is, e.g., 10, while the number of the spacers 6 is, e.g., 10, whereby a spacing between the balls 5 receiving the load becomes large, the number of the balls 5 receiving the load is approximately halved, and both of the load capacity and the rigidity of the ball screw device decrease.

Another problem with respect to the linear motion device in the prior art explained above is that it is desirable to make a slide friction between the spacer and the ball as small as possible in terms of considering an operability of the linear motion device. However, as shown in FIG. 35, if a curvature (1/r) of the ball 5 is equalized to a curvature (1/R) of the spacer concave surface 6, sliding occurs when the ball comes into contact with the entire concave surface of the spacer, with the result that the frictional force increases and the operability is deteriorated.

It is very important in this linear motion device to control a thickness of the spacer in order to set an optimum total gap in each train of balls endlessly circulated, i.e., to control an inter-ball span when the spacer is interposed therebetween. But when manufacturing the spacer 7 aiming at forming the concave surface 6 having the same curvature (1/R) as the curvature (1/r) of the ball 5, there might be formed the concave surfaces 6 having larger and smaller curvatures than the curvature (1/r) of the ball 5 because of a dimensional scatter. Especially if the curvature (1/R) of the concave surface 6 of the spacer 7 is smaller than the curvature (1/r) of the ball 5, the balls are destabilized when the spacer 7 is disposed between the balls 5, and it is extremely difficult to measure a dimension between the balls 5 (which is a thickness of the spacer 7). The problem is therefore that the spacer 7 exhibiting a high accuracy can not be manufactured. Moreover, in a structure as shown in FIG. 36, it is required that the diameter of the spacer be smaller than the diameter of the ball. However, as shown in FIG. 36, in the case of the pipe-like spacer 8, a minor diameter of the pipe-like spacer 8 becomes small due to the thickness thereof, and the balls 5 are hard to stabilize. There is no alternative but to increase the major diameter of the pipe-like spacer 8 for stabilizing the balls 5. Consequently, there arises a problem in which the spacer 8 interferes with other components during the circulation.

According to Japanese Patent Application Post-Exam Publication No. 40-24405, the through-hole formed in the partition member is used as the reservoir of the lubricating oil for preventing a seizure if a rotating velocity and a revolution velocity of the ball are high as in the case of a rolling bearing. In the linear motion device, however, almost no seizure problem arises because of the above velocities being by far lower than those of the rolling bearing. A further problem in the prior art example is that a lubricating oil reserving capacity of the through-hole is insufficient.

SUMMARY OF THE INVENTION

It is a primary object of the present invention, which was devised under such circumstances, to provide a linear motion device (e.g., ball screw device, linear guide device) which is capable of avoiding decreases in load capacity and rigidity with a restraint of reducing the number of load balls even when spacers are disposed between the load balls, which enhances a circulative characteristic of the spacer by minimizing friction between the load balls and the spacer, and which prevents deterioration of an operability and an occurrence of noises due to impingement between the balls, a deteriorated quality of sound produced, and frictional damage to the balls.

To accomplish the above object, according to a first aspect of the present invention, a ball screw device comprises a screw shaft of which an outer peripheral surface is formed with a helical screw groove, a nut of which an inner peripheral surface is formed with a helical screw groove corresponding to the helical screw groove of the screw shaft, a helical circulation path defined by the two helical screw grooves, and a multiplicity of balls so disposed in the helical circulation path as to be capable of rolling. A spacer having two concave surfaces facing respectively to the balls is disposed between the balls adjacent to each other, and a section of each of the concave surfaces of the spacer is formed of two circular arcs of which central positions deviate from each other to form a Gothic arch.

According to the first aspect of the present invention, the spacer having the two concave surfaces facing adjacent balls, is disposed between the adjacent balls. The spacer takes such a configuration of the concave surface that the adjacent balls come into linear- or point-contact with the concave surface with a smaller slide resistance. For instance, the section of each concave surface of the spacer is formed of two circular arcs of which the central positions deviate from each other to form a Gothic arch. Therefore, the load balls can be well circulated through within the helical screw grooves while contacting the spacer concave surfaces.

The ball screw device is therefore capable of reducing the friction between the load balls and the spacers, enhancing the circulative characteristic of the spacer, and preventing the deterioration of the operability and the occurrence of noises due to the impingement of the balls on each other, the deteriorated quality of sound produced, and the frictional damage to the balls. The spacer has such a configuration that a thickness thereof is smaller than that of the spacer ball, and hence there is no possibility of inducing the decreases in load capacity and in rigidity with the restraint of reducing the number of the load balls.

In the ball screw device according to the first aspect of the invention, supposing that all the balls and all the spacers inserted into the helical circulation path be converged on one side, a gap formed between a leading ball and a tailing spacer is termed a total gap, and given that a spacing (S1) of this total gap is larger than zero (S1>0) and that the one spacer, i.e., the tailing spacer be eliminated, the number of the balls and the number of the spacers are set so that a spacing (S2) of a gap between the leading ball and a tailing ball is smaller than a 0.8-fold value of a diameter (ds) of the spacer (S2<0.8×ds).

As described above, the total gap in the circulation path is set larger than zero, and one spacer is eliminated, at which time the spacing of the gap between the leading ball and the tailing ball is set in the relationship of the numerical values given above. In this case, it never happens that the spacer is skewed within the circulation path because of the gap in the circulation path being too large. It too never happens that an operational defect is caused by the friction between the balls and the spacer because of the gap in the circulation path being too small. The intra-circulation-path gap is properly set, and therefore the spacer is not skewed at approximately 60° or greater, and good operability can be maintained.

In the ball screw device according to the first aspect of the present invention, it is preferable that the spacer be so constructed as to be elastically deformable between the adjacent balls.

The spacer is thus so constructed as to be elastically deformable between the adjacent balls, in which case a ball-to-ball distance can be controlled through the elastic deformation of the spacer. Accordingly, a charging rate of the balls and the spacer with respect to a circuit length can be extremely easily set to a proper value. For example, the charging rate can be controlled by one type of spacers, which obviates a troublesome design work of preparing several types of spacers on a trial basis and combining these spacers. Further, it is also possible to attain a charging rate of 100% (i.e., the spacing between the ball and the spacer is zero) as the necessity may arise. Note that the spacer may be elastically deformed in terms of a structure, or may also be elastically deformed based on only the material itself.

According to a second aspect of the present invention, a ball screw device comprises a screw shaft of which an outer peripheral surface is formed with a helical screw groove, a nut of which an inner peripheral surface is formed with a helical screw groove corresponding to the helical screw groove of the screw shaft, a helical circulation path defined by the two helical screw grooves, and a multiplicity of balls so disposed in the helical circulation path as to be capable of rolling. In this ball screw device, a spacer having two concave surfaces facing adjacent balls is disposed between the balls adjacent to each other, and supposing that all the balls and all the spacers inserted into the helical circulation path be converged on one side, a gap formed between a leading ball and a tailing spacer is termed a total gap, and given that a spacing (S1) of this total gap is larger than zero (S1>0) and that the one spacer, i.e., the tailing spacer be eliminated, the number of the balls and the number of the spacers are set so that a spacing (S2) of a gap between the leading ball and a tailing ball is smaller than a 0.8-fold value of a diameter (ds) of the spacer (S2<0.8×ds).

As explained above, the total gap in the circulation path is set larger than zero, and one spacer is eliminated, at which time the spacing of the gap between the leading ball and the tailing ball is set in the relationship of the numerical values given above. Hence, it never happens that the spacer is skewed within the circulation path because of the gap in the circulation path being too large. It too never happens that an operational defect is caused by the friction between the balls and the spacer because of the gap in the circulation path being too small. The intra-circulation-path gap is properly set, and therefore the spacer is not skewed at approximately 60° or greater, and good operability can be maintained.

According to a third aspect of the present invention, a linear motion device comprises an outer member, an inner member facing to the outer member via a gap, a multiplicity of balls disposed between the outer member and the inner member, and a spacer interposed between the balls. In this linear motion device, the spacer has such a configuration that the balls adjacent to each other come into contact with outer edges thereof or portions vicinal to the outer edges.

Thus, in the linear motion device according to the third aspect of the present invention, the spacer has such a configuration that the adjacent balls come into contact with the outer edges or the portions vicinal to the outer edges. Accordingly, the spacer is capable of retaining the ball in a much wider area, and it is feasible to take a still larger retaining allowance for the spacer to retain the ball. Furthermore, the ball is easy to stabilize, and a measurement of a dimension (i.e., a thickness of the spacer) between the balls is facilitated, whereby the spacer exhibiting a high precision can be manufactured.

According to a fourth aspect of the present invention, a linear motion device comprises an outer member, an inner member facing to the outer member via a gap, a multiplicity of balls disposed between the outer member and the inner member, and a spacer interposed between the balls. In this linear motion device, the spacer has concave surfaces with which the balls adjacent to each other come into linear contact.

Thus, in the linear motion device according to the fourth aspect of the present invention, the spacer is interposed between the balls and has the concave surfaces with which the adjacent balls come into linear contact. Accordingly, the friction between the balls and the spacer is small, and it is feasible to prevent the decline of the operability and the occurrence of noises due to the impingement of the balls on each other, the deteriorated quality of sound produced, and the frictional damage to the ball.

In the linear motion device according to the third or fourth aspect of the present invention, the spacer has such a configuration that the adjacent balls are brought into contact with at least three or more portions of the spacer.

As described above, the spacer assumes the configuration that the adjacent balls come into contact with at least three or more portions of the spacer, in which case, the balls can contact the spacer with an extremely small friction. The friction between the balls and the spacer can be remarkably reduced by decreasing a slide resistance between the balls and the spacer, and the circulative characteristic of the balls and the spacers is enhanced. At the same time, the balls are easy to stabilize, and a lubricating agent can be easily led to the spacer. The slide resistance between the balls and the spacer can be made far smaller.

According to a fifth aspect of the present invention, a linear motion device comprises an outer member, an inner member facing to the outer member via a gap, a multiplicity of balls disposed between the outer member and the inner member, and a spacer interposed between the balls, wherein the spacer has a through-hole formed in a thinnest portion thereof.

As explained above, according to the fifth aspect of the present invention, the spacer has the through-hole formed in the thinnest portion thereof. In the linear motion device, a rotating velocity and a revolution velocity of the ball are very low as compared with a rolling bearing, and therefore almost no seizure problem arises. A contact area between the balls and the spacer becomes, however, far smaller owing to the through-hole of the spacer, and a fluctuation in kinetic friction force can be made extremely small. At the same time, there is an advantage that an influence upon a strength thereof is remarkably small because of the through-hole being formed in the minimum-thickness portion between the concave surfaces.

Other features and advantages of the present invention will become readily apparent from the following description taken in conjunction with the accompanying drawings.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention, in which.

DESCRIPTION OF THE PREFERRED EMBODIMENTS

A ball screw device and a linear motion device in preferred embodiments of the present invention will hereinafter be described with reference to the accompanying drawings.

First through third embodiments deal with the ball screw device, and fourth through sixth embodiments deal with a linear guide.

First Embodiment

Figure 1A:
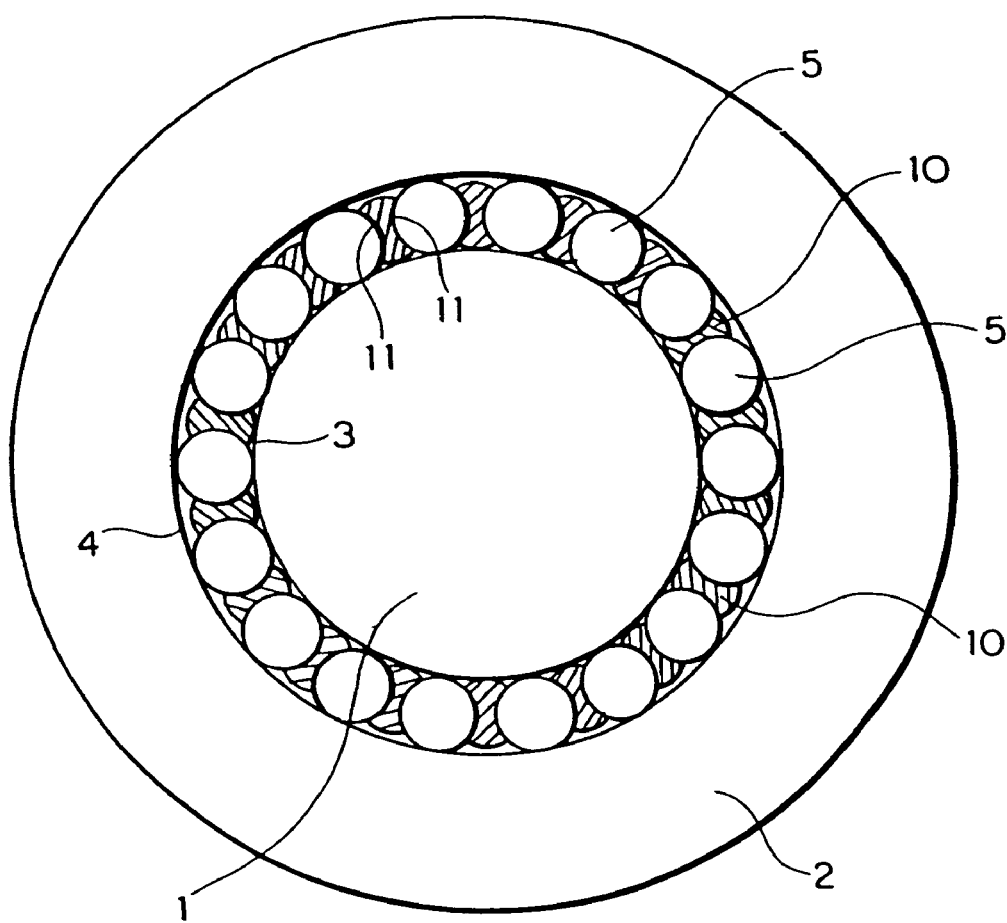
FIG. 1A is a side view showing a ball screw device in a first embodiment of the present invention.
Figure 1B:
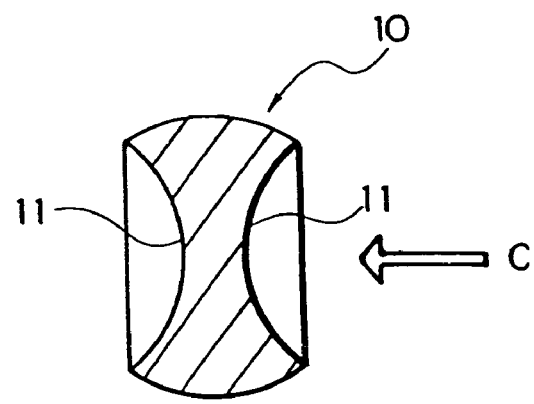
FIG. 1B is a sectional view showing a spacer installed in the ball screw device shown in FIG. 1A.
Figure 2A:
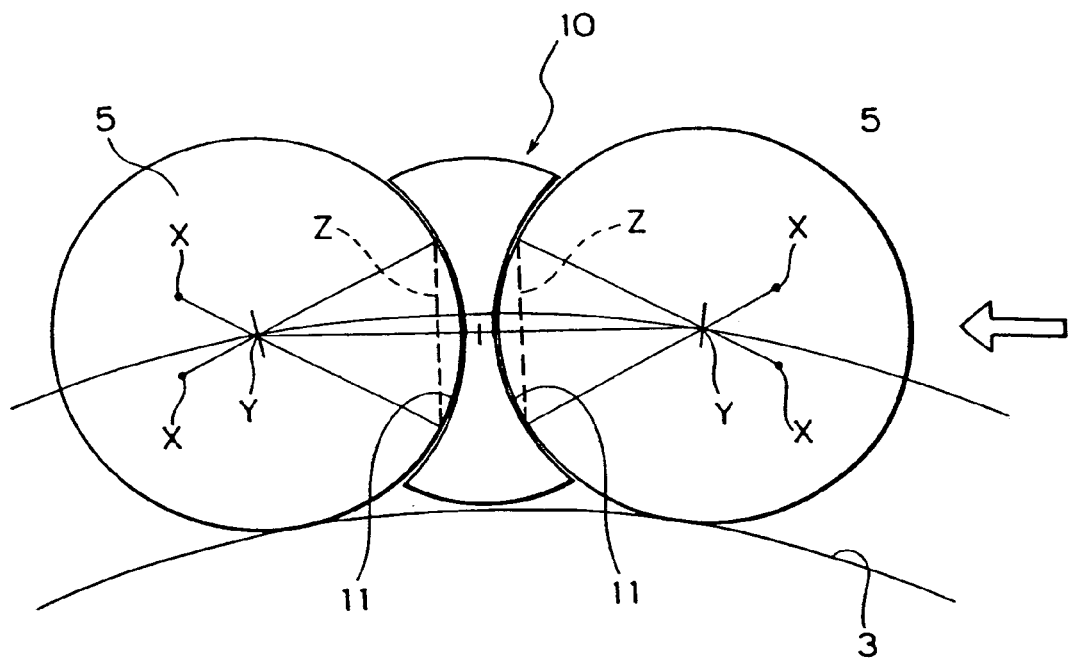
FIG. 2A is an enlarged view showing balls and the spacer of the ball screw device shown in FIGS. 1A and 1B.
Figure 2B:
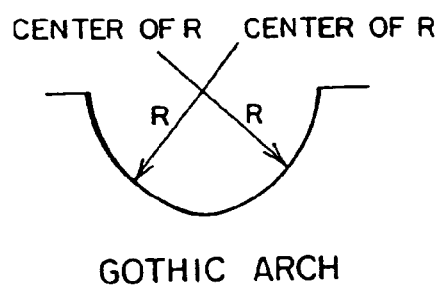
FIG. 2B is an explanatory view showing a configuration of Gothic arch.
Figure 3:
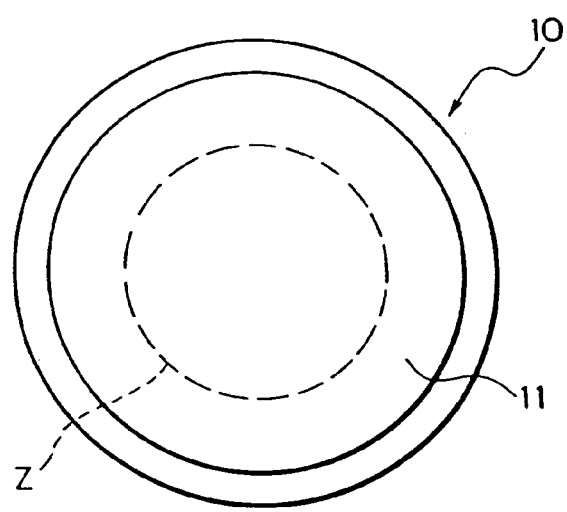
FIG. 3 is an enlarged view of the spacer of the ball screw device shown in FIG. 1B as viewed in a direction C in FIG. 1B.

FIG. 1A is a side view showing a ball screw device in a first embodiment of the present invention. FIG. 1B is a sectional enlarged view showing a spacer installed in the ball screw device illustrated in FIG. 1A. FIG. 2A is an enlarged view showing a ball of the ball screw device shown in FIG. 1A and the spacer. FIG. 2B is an explanatory view showing a configuration of Gothic arch. FIG. 3 is an enlarged view showing the spacer of the ball screw device illustrated in FIGS. 1A and 1B.

As illustrated in FIG. 1A, helical screw grooves 3, 4 corresponding to each other are formed in an outer peripheral surface of a screw shaft 1 and in an inner peripheral surface of a nut 2. A multiplicity of balls 5 are so disposed as to be rollable within a helical circulation path defined by the two screw grooves 3, 4. When one of the screw shaft 1 and the nut 2 is moved in an axial direction by relatively rotating the screw shaft 1 and the nut 2, the screw shaft 1 and the nut 2 make a smooth relative helical motion through rolling of the multiplicity of balls 5. Note that a ball circulating method in the ball screw device in the first embodiment is applicable to all types such as a circulation piece type, an end cap type and a tube type etc.

A multiplicity of spacers 10 each made from a sphere are interposed between the neighboring balls 5 receiving a load. The spacer 10 is, as shown in FIG. 1B, formed with two concave surfaces 11, 11.

A section of each concave surface 11 is formed of two circular arcs of which central positions deviate from each other to form a Gothic arch. To be more specific, the Gothic arch assumes, as shown in FIG. 2B, such a configuration that the two central positions each having a radius R deviate a predetermined distance from each other. As illustrated in FIG. 2A, the two central positions (X, X) of each concave surface 11, with lines connecting the respective circular arcs to the centers X, i.e., radiuses intersecting each other at a central position (Y) of the ball 5, deviate the predetermined distance from each other.

Thus, the section of each concave surface 11 takes the Gothic arch shape, and therefore, as shown in FIG. 3, the ball 5 is allowed to linearly contact the concave surface 11 of the spacer 10 in a circular shape shown by a broken line Z.

Accordingly, the ball 5 is capable of being brought into contact with the concave surface 11 of the spacer 10 with an extremely small friction. And it is feasible to remarkably reduce the friction therebetween by decreasing a slide resistance between the ball 5 and the spacer 10. Hence, a circulative characteristic of the spacer 10 is enhanced, and it is also possible to highly restrain the balls 5 from being deteriorated in terms of their operability due to impingement between these balls 5 and from being damaged due to the frictions therebetween. It too never happens that fluctuations in torque and a noise problem might be induced.

Figure 34:
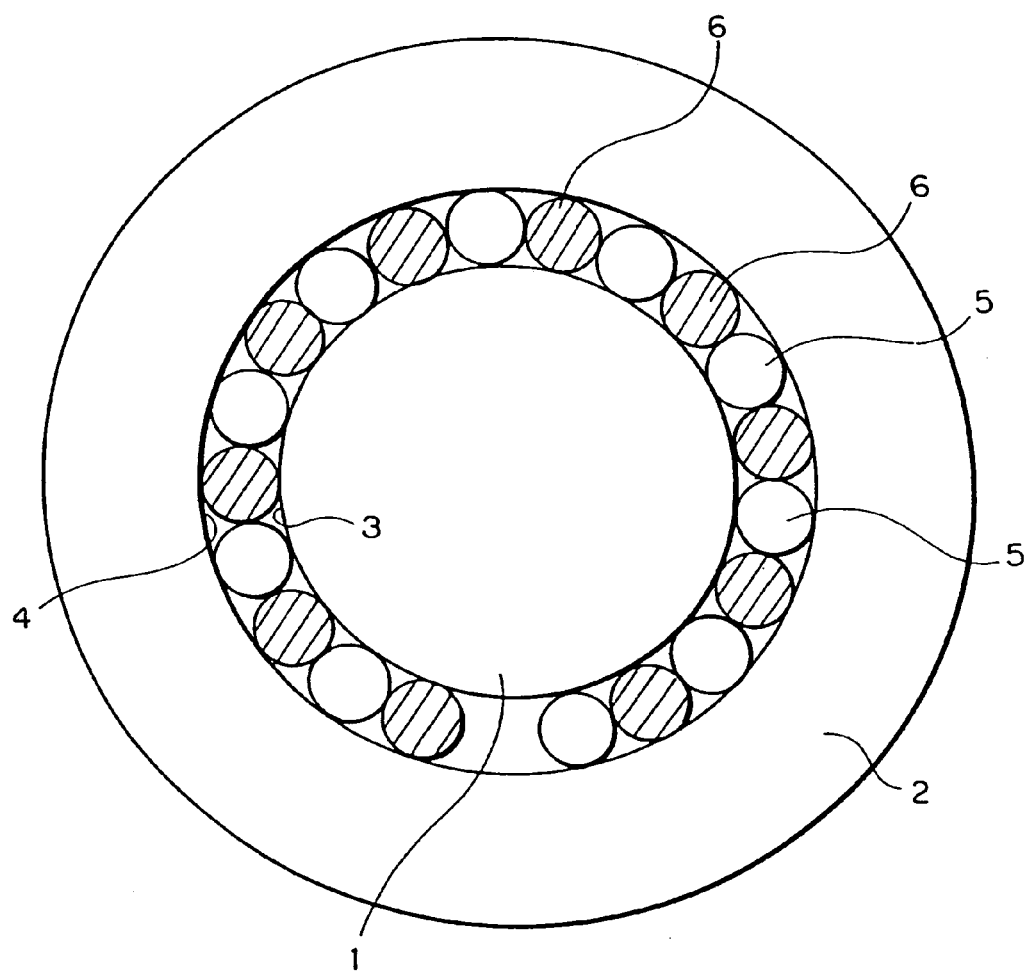
FIG. 34 is a side view showing another ball screw device in the prior art.
Figure 35:
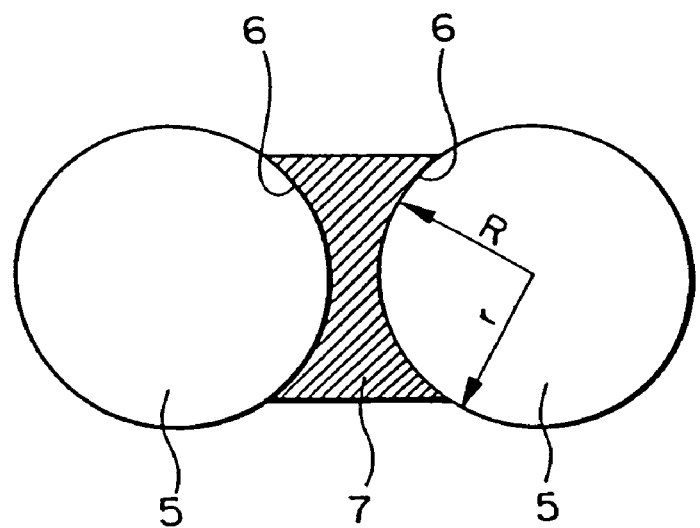
FIG. 35 is a sectional view showing the balls and the spacer in the prior art.
Figure 36:
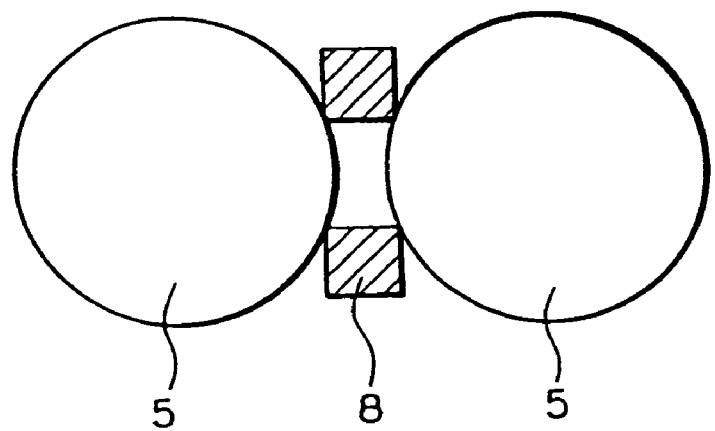
FIG. 36 is a sectional view showing other balls and spacer in the prior art.

The spacer 10 can be made far smaller in configuration than the prior art spacer ball, and hence the number of the balls 5 receiving the load can be significantly higher than in the conventional art. That is, in the conventional ball screw device having the spacer balls shown in FIG. 34 the number of the load supporting balls 5 is 10, and the number of the spacer balls 6 is 10. By contrast, in the ball screw device in the first embodiment shown in FIG. 1A, the number of the load supporting balls 5 is 18, and the number of the spacers 10 is 18. The number of the load supporting balls 5 is approximately doubled as compared with the prior art. Accordingly, the invention does not exhibit the problem that a load capacity or a rigidity might decrease due to reduction in the number of the load balls 5.

Note a ratio of the number of the balls 5 to the number of the spacers 10 is 1:1 in the example shown in FIG. 1A and may be, as a matter of course, 2:1 or 3:1.

Figure 4A:
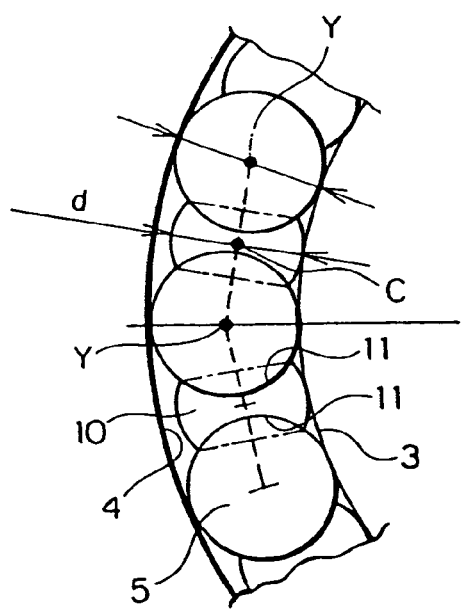
FIG. 4A is a partial side view showing the ball screw device in a first modification of the first embodiment of the present invention.
Figure 4B:
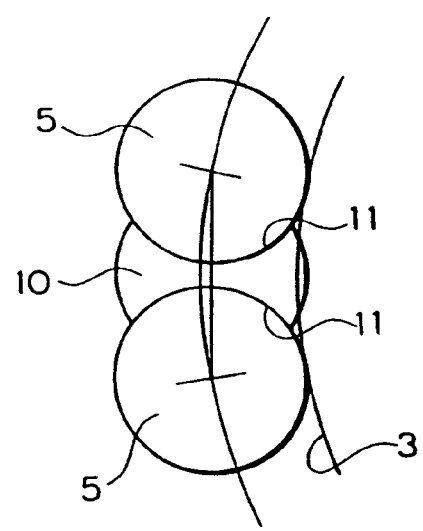
FIG. 4B is an explanatory view showing the principle of the first modification.

FIG. 4A is a partial side view of the ball screw ball device, showing a first modification of the first embodiment of the present invention. FIG. 4B is an explanatory view showing the principle of the first modification.

If a diameter of the sphere for constructing the spacer 10 is equalized to a diameter of the ball 5, as shown in FIG. 4B, when the ball 5 is so disposed as to contact the concave surface 11 of the spacer 10, it follows that the spacer 10 comes to an interference with the screw groove 3.

Accordingly, in the first modification of the first embodiment of the present invention, as shown in FIG. 4A, a center C between central positions (Y, Y) of the two balls 5, 5 adjacent to each other is set as a center of the sphere for constructing the spacer 10, and a diameter (d) of the sphere is set such that a radius is a distance or shorter from the central point c to the screw groove 3. Therefore, it never happens that the spacer 10 is in the interference with the screw groove 3, and the spacer 10 with a reduced diameter can be disposed with stability between the balls 5 to achieve a good operability.

Figure 5:
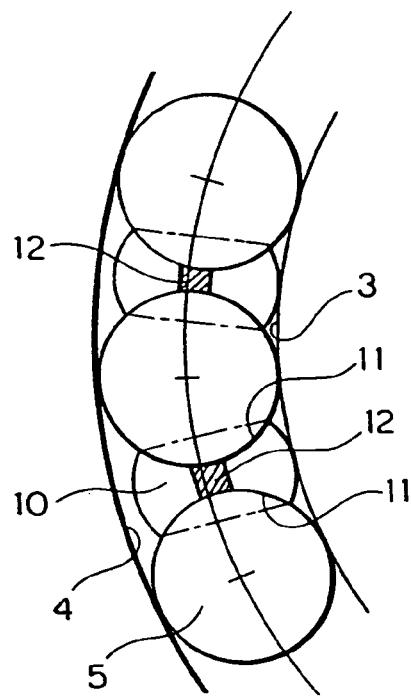
FIG. 5 is a partial side view showing the ball screw device in a second modification of the first embodiment of the present invention.

FIG. 5 is a partial side view of the ball screw device, showing a second modification of the first embodiment of the present invention.

In the second modification of the first embodiment, the spacer 10 is formed with a through-hole 12 between the two concave surfaces 11, 11. The through-hole 12 contains a lubricating agent such as lubricating grease and oleo-resin etc. With this lubricating agent, the slide resistance between the ball 5 and the spacer 10 is further decreased, and the friction therebetween can be remarkably reduced, whereby the circulative characteristic of the spacer 10 can be more enhanced. Note that the ball circulating method in the ball screw device in the second modification of the first embodiment is applicable to all types such as the circulation piece type, the end cap type and the tube type etc. Further, a retainability with respect to the through-hole 12 is also enhanced by use of the grease and the oleo-resin.

Figure 6:
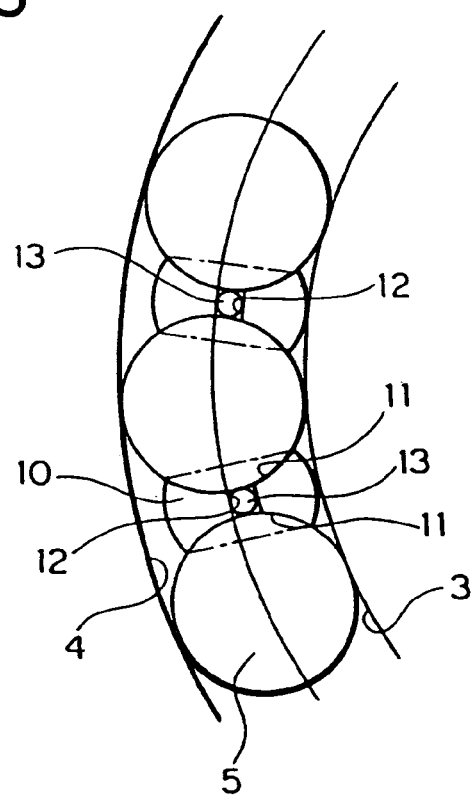
FIG. 6 is a partial side view showing the ball screw device in a third modification of the first embodiment of the present invention.

FIG. 6 is a partial side view of the ball screw device, showing a third modification of the first embodiment of the present invention.

In the third modification of the first embodiment, the spacer 10 is formed with the through-hole 12 between the two concave surfaces 11, 11. A small-diameter ball 13 is disposed in this through-hole 12.

The small-diameter ball 13 is brought into rolling-contact with the ball 5, while the spacer 10 comes into (not linear contact but) point-contact with the ball 5. It is therefore possible to further reduce the slide resistance between the ball 5 and the spacer 10, and to thus remarkably decrease the friction therebetween. The circulative characteristic of the spacer 10 can also be enhanced.

Note that the ball circulating method in the ball screw device in the third modification of the first embodiment is applicable to all types such as the circulation piece type, the end cap type and the tube type etc.

Figure 7:
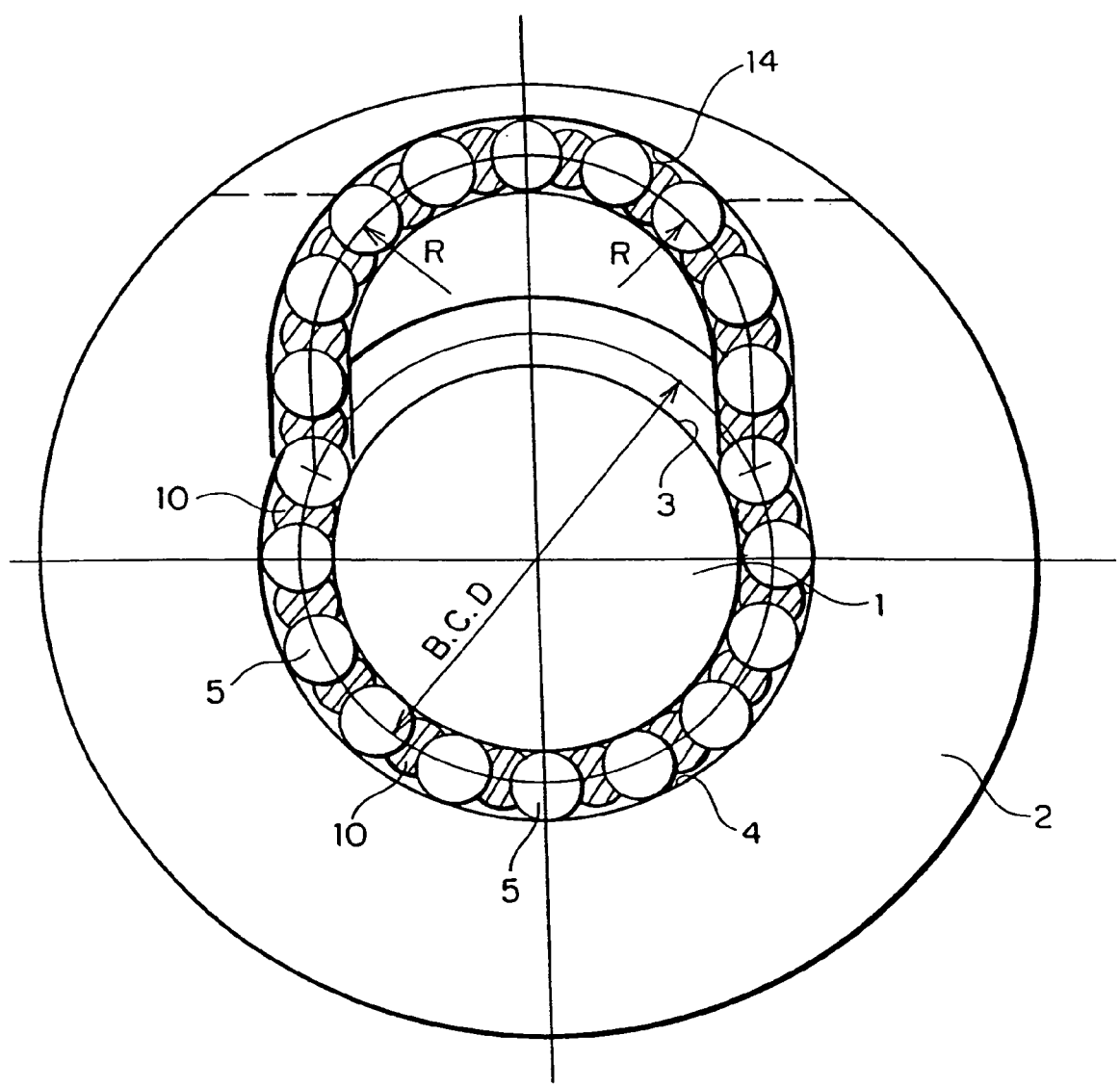
FIG. 7 is a plan view showing the ball screw device in a fourth modification of the first embodiment of the present invention.

FIG. 7 is a plan view of the ball screw device, showing a fourth modification of the first embodiment of the present invention.

The ball screw device in the fourth modification of the first embodiment is classified as a tube circulation type ball screw device including a circulation tube 14, formed in association with the screw grooves 3, 4, through which to circulate the balls 5 and the spacers 10.

The circulation tube 14 is also formed with a bend radius. According to the fourth modification of the first embodiment, this bend radius (R) is set equal to a radius of a ball center diameter (BCD) of the screw grove 3 of the screw shaft 1. Thereby, the spacer 10 made from the sphere having the diameter (d) as set in the first modification of the first embodiment, is capable of passing through the circulating tube 14 having the bend radius with a good operability.

It is to be noted that the first embodiment of the present invention can be modified in many ways. For example, a material from which the spacer 10 is formed may be a steel, the oleo-resin, a resin or an oleo-resin sintered metal. In the case of the oleo-resin, the oil can be always supplied into the helical screw groove circulation path from the oleo-resin, and hence a long-term lubricating function can be secured maintenance-free, and an anti-abrasion property can be enhanced.

Second Embodiment

Figure 8A:
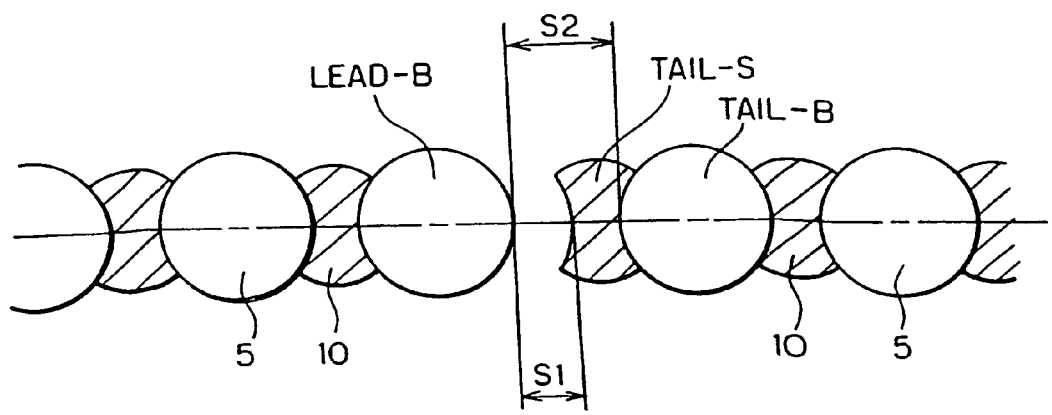
FIG. 8A is an explanatory view showing the principle of the ball screw device in a second embodiment of the present invention.
Figure 8B:
FIG. 8B is a sectional view of the spacer.
Figure 9:
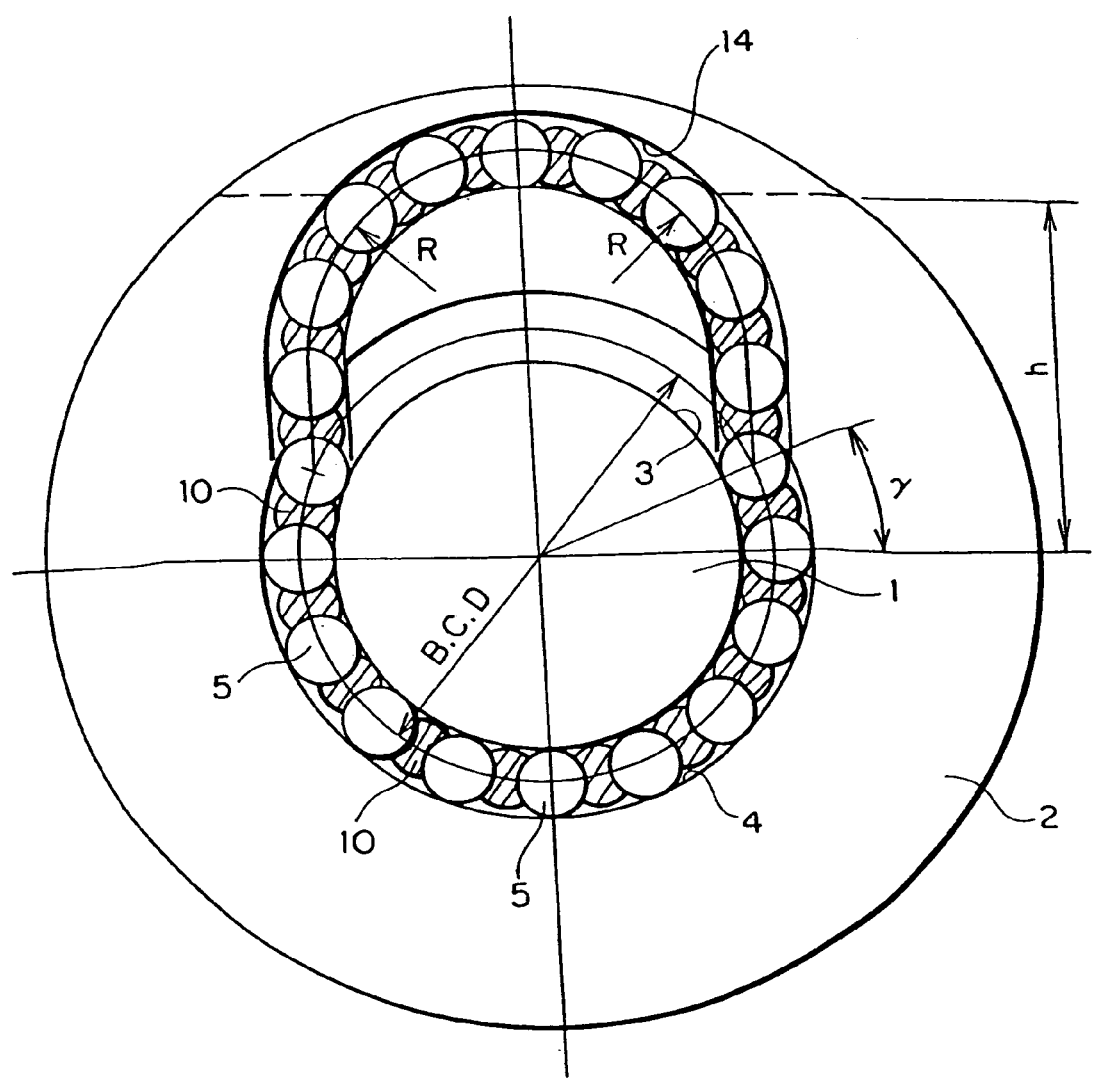
FIG. 9 is a side view showing the ball screw device in the second embodiment of the present invention.

FIG. 8A is an explanatory view showing the principle of the ball screw device in a second embodiment of the present invention. FIG. 8B is a sectional view of the spacer. FIG. 9 is a side view showing the ball screw device in the second embodiment of the present invention.

In the second embodiment, as shown in FIG. 8A, supposing that all the balls and all the spacers 10 inserted into the helical circulation path defined by the screw grooves 3, 4 be converged on one side, a gap formed between a leading ball (LEAD-B) and a tailing spacer (TAIL-S) is termed a total gap. Given that a spacing (S1) of this total gap is larger than zero (i.e., S1>0) and that one spacer, i.e., the tailing spacer (TAIL-S) be eliminated, the number of the balls 5 and the number of the spacers 10 are set so that a spacing (S2) of a gap between the leading ball (LEAD-B) and a tailing ball (TAIL-B) is smaller than a 0.8-fold value of a diameter (ds, see FIG. 8B) of the spacer (i.e., S2<0.8×ds).

The spacings (S1, S2) of the gaps can be controlled by, to be specific, as shown in FIG. 9, changing design values of a notch height (h) of the circulation tube 14, a rake angle (γ) of the ball 5 and the bend radius (R) of the circulation tube 14.

As described above, the spacing (S1) of the total gap in the circulation path is set such as S1>0, and the spacing (S2) of the gap between the leading ball (LEAD-B) and the tailing ball (TAIL-B) in the case of eliminating the single spacer (TAIL-S) is set such as S2<0.8×ds. Therefore, it never happens that the spacer 10 is skewed in the circulation path because of the intra circulation path spacing being too large. There is also no possibility in which the operational deterioration is induced due to the friction between the ball 5 and the spacer 10 because of the intra circulation path spacing being too small. The intra circulation path spacings (S1, S2) are properly set, and hence the spacer 10 is never skewed at approximately 60° or more within the circulation path, and the good operability can be maintained.

Figure 10:
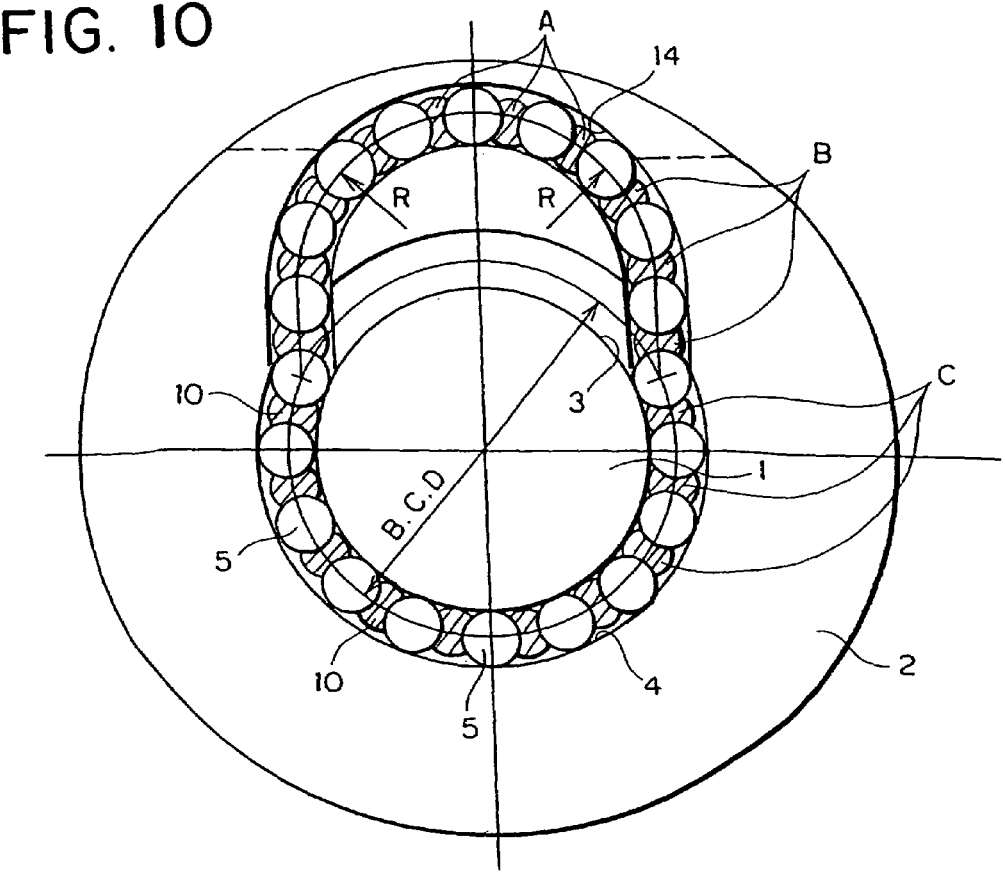
FIG. 10 is a side view showing the ball screw device in a modification of the second embodiment of the present invention.

FIG. 10 is a side view of the ball screw device, showing a modification of the second embodiment of the present invention. In this modification, there are prepared several types of spacers 10 each having a different width. For example, as shown in FIG. 10, there are prepared several spacers 10 having a width A, several spacers 10 having a width B, several spacers 10 having a width C, and the spacings (S1, S2) of the gaps are controlled corresponding to differences therebetween. In this case too, since the spacings (S1, S2) in the circulation path are properly set, it never happens that the spacer 10 is skewed at approximately 60° or larger in the circulation path, and the good operability can be maintained. Note that the diameter of the spacer 10 is not changed, and hence there is no necessity for specially designing the nut 2.

Incidentally, for instance, the sectional configuration of the spacer is not necessarily the Gothic arch but may be applied as a single radius or a U-shape.

Further, examples and comparative examples of the second embodiment will be discussed later on.

Third Embodiment

Figure 11:
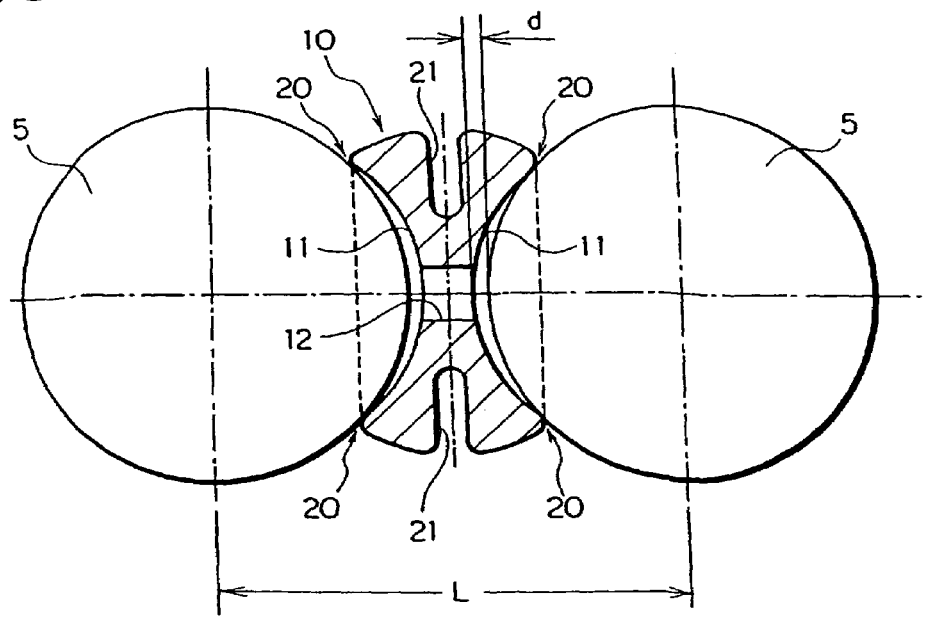
FIG. 11 is an enlarged view showing the balls and the spacer of the ball screw device in a third embodiment of the present invention.
Figure 12:
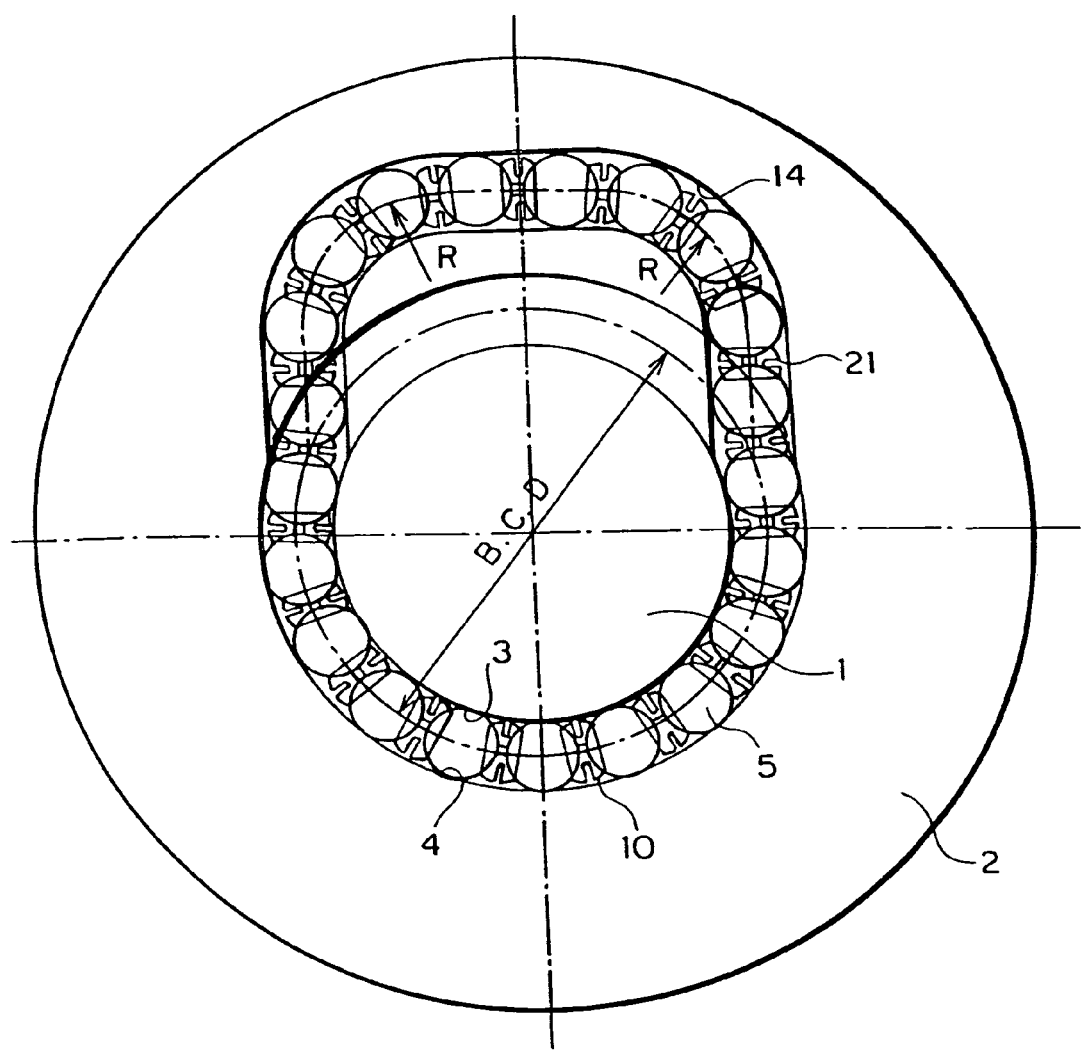
FIG. 12 is a side view showing the ball screw device in the third embodiment of the present invention.

FIG. 11 is an enlarged view showing the ball and the spacer of the ball screw device in a third embodiment of the present invention. FIG. 12 is a side view showing the ball screw device in the third embodiment of the present invention.

The ball screw device in the third embodiment illustrated FIG. 12 is classified as the tube circulation type ball screw device including a circulation tube 14, formed in association with the screw grooves 3, 4, and through which the balls 5 and the spacers 10 are circulated.

The circulation tube 14 is also formed with a bend radius. According to the third embodiment too, this bend radius (R) is set equal to the radius of the ball center diameter (BCD) of the screw groove 3 of the screw shaft 1.

As shown in FIG. 11, the spacer 10 made from a sphere is formed with the two concave surfaces 11. The section of each concave surface 11 may be formed of two circular arcs of which central positions deviate from each other to form a Gothic arch, or it may take other configurations. The spacer 10 is constructed to contact the ball 5 at contact points indicated by the numeral 20.

In the third embodiment, the spacer 10 is integrally formed from an elastically deformable material such as a resin etc., and a slit 21 is formed in an outer peripheral surface of the spacer 10. The spacer 10 is thereby elastically deformed due to a flexure of the slit 21 between the balls 5, 5, and contacts the balls 5 at the contact points 20. At the same time, a spacing (d) between the concave surface 11 of the spacer 10 and the outer peripheral surface of the ball 5 can be extended and reduced. Accordingly, a distance (L) between the balls 5, 5 can be controlled by elastically deforming the spacer 10, and a charging rate of the balls 5 and the spacers 10 with respect to a circuit length can easily be set to a proper value. For example, the charging rate can be controlled by one type of the integrally formed spacers, which obviates a troublesome design work of preparing several types of spacers on a trial basis and combining these spacers. Further, it is also possible to attain a charging rate of 100% (i.e., the spacing between the ball and the spacer is zero) as the necessity may arise, and the cost therefore decreases.

Note that the spacer 10 may be elastically deformed in terms of a structure as in the case of the slit 21 described above, or may also be elastically deformed based on only the material itself as in the case of the resin and a rubber etc.

Moreover, as shown in FIG. 11, the through-hole 12 for receiving the oil may also be formed between the two concave surfaces 11 of the spacer 10.

Figure 13:
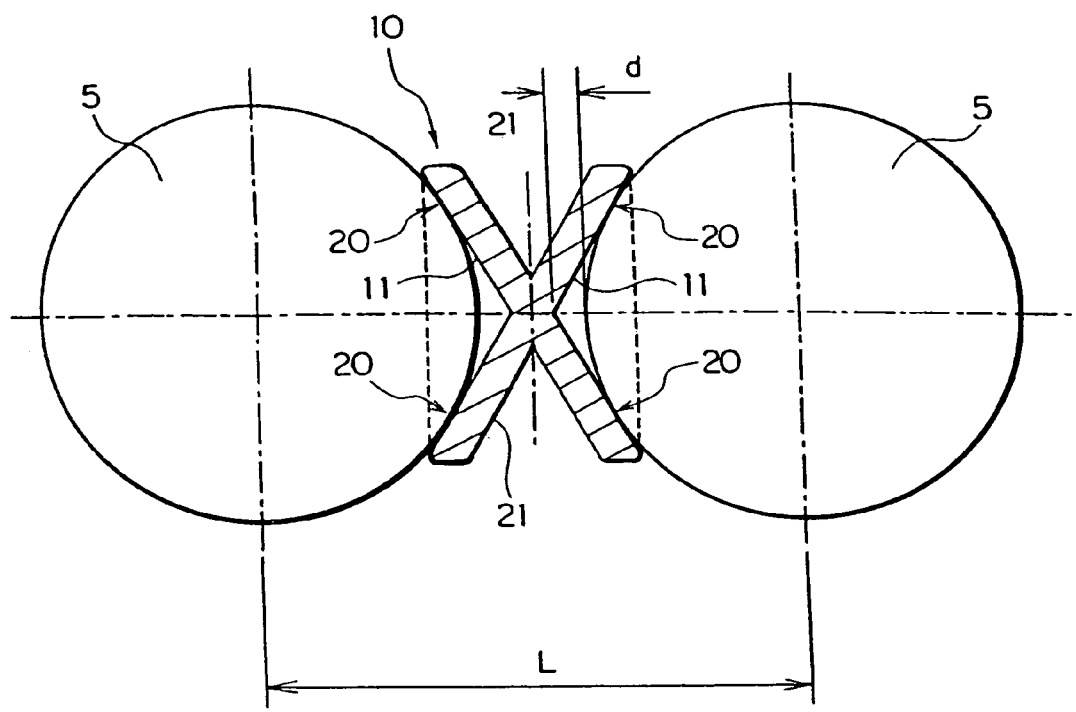
FIG. 13 is an enlarged view showing the balls and the spacer of the ball screw device in a modification of the third embodiment of the present invention.

FIG. 13 is an enlarged view of the ball and the spacer of the ball screw device in a modification of the third embodiment of the present invention.

In this modification, the concave surface 11 of the spacer 11 takes slightly a conical shape, and the spacing (d) between the concave surface 11 of the spacer 10 and the outer peripheral surface of the ball 5 is set larger than in the case of FIG. 11.

Further, the slit 21 of the spacer 10 is formed in a V-shape. In this case too, the spacer 10 is elastically deformed based on the flexure of the slit 21 between the balls 5, 5, and is brought into contact with the balls 5 at the contact points 20. At the same time, the spacing (d) between the concave surface 11 of the spacer 10 and the outer peripheral surface of the ball 5 can be extended and reduced, and hence the proper value of the charging rate of the balls 5 and the spacers 10 with respect to the circuit length can easily be set by controlling the distance (L) between the balls 5, 5.

Fourth Embodiment

Figure 14:
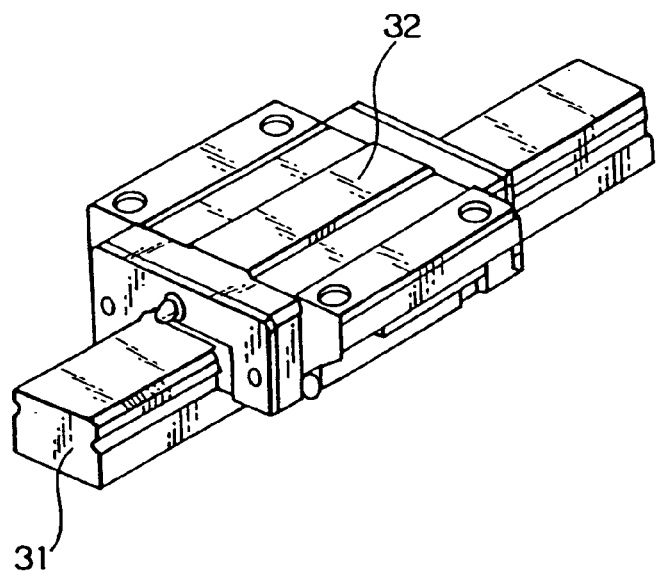
FIG. 14 is a perspective view showing a linear guide in a fourth embodiment of the present invention.
Figure 15:
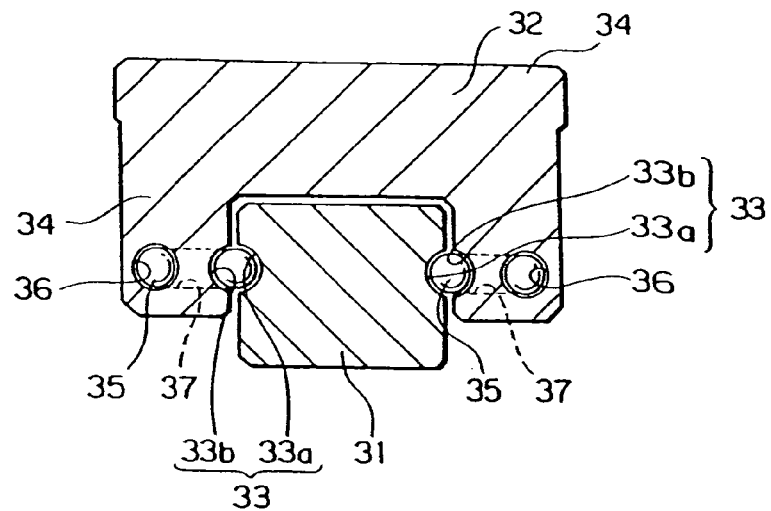
FIG. 15 is an enlarged sectional view of the linear guide shown in FIG. 14.
Figure 16:
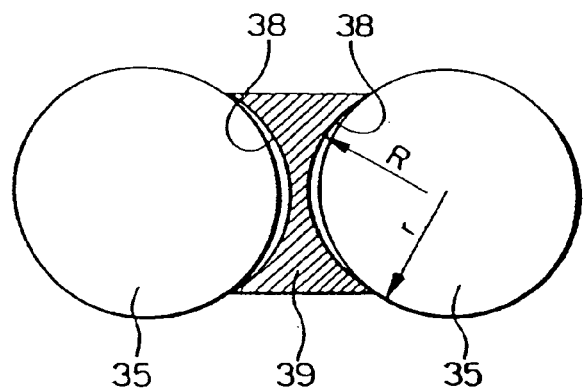
FIG. 16 is an enlarged sectional view showing the balls installed in the linear guide shown in FIG. 14, and the spacer interposed between the balls.

FIG. 14 is a perspective view showing a linear guide in a fourth embodiment of the present invention. FIG. 15 is a sectional view of the linear guide shown in FIG. 14. FIG. 16 is a sectional view showing the balls installed in the linear guide shown in FIG. 14, and the spacer interposed between the balls.

As illustrated in FIG. 14, a slider 32 taking a U-shape in section, and which is defined as an outer member, is disposed astride of a guide rail 31 defined as an inner member assuming substantially a rectangular shape in cross-section. As illustrated in FIG. 15, track grooves 33a each taking a configuration of circular arc and extending in the axial direction, are formed in two right-and-left side surfaces of the guide rail 31.

Leg members 34 provided on two right-and-left sides of the slider 32 are also formed with track grooves 33b each taking the configuration of a circular arc and extending in the axial direction. A travel path of the balls 35 is defined by the track groove 33a of the guide rail 31 and the track groove 33b of the slider 32.

Further, hole-like return paths 36 are formed more outward than the paths 33 of the two leg members 34 of the slider 32. The paths 33 and the return paths 36 communicate with each other via turn-paths 37 at an end portion thereof. The circulation path of the balls 35 is thus constructed of the travel-paths 33, the return-paths 36 and the turn-paths 37.

Moreover, as shown in FIG. 16, a spacer 39 formed with two concave surfaces 38, 38 facing respectively to the adjacent balls 35, 35, is disposed between the balls 35, 35. A curvature (1/R) of the concave surface 38 is set larger than a curvature (1/r) of the ball 35, whereby the spacer 39 is so structured as to linearly contact the adjacent balls 35, 35 at outer edges or at portions vicinal to the outer edges.

Accordingly, the spacer 39 is capable of retaining the ball 35 in a much wider area, and it is feasible to take a still larger retaining allowance for the spacer 39 to retain the ball 35. Therefore, the ball 35 is easy to stabilize, and a measurement of a dimension (i.e., a thickness of the spacer 39) between the balls 35 is facilitated, whereby the spacer 39 exhibiting a high precision can be manufactured.

Figure 17:
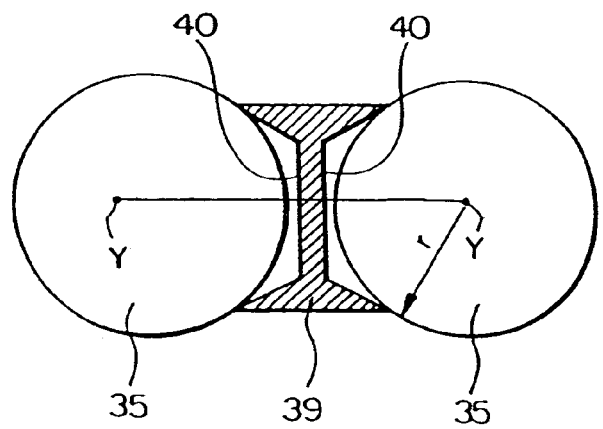
FIG. 17 is an enlarged sectional view showing the balls installed in the linear guide in a first modification of the fourth embodiment of the present invention and the spacer interposed between the balls.

FIG. 17 is a sectional view of the ball and the spacer, showing a first modification of the fourth embodiment of the present invention.

In the first modification of the fourth embodiment, the spacer 39 assumes such a configuration that central portions 40, 40 on both sides in section are recessed and rectilinearly connected to the outer edges. With this configuration, the spacer 39 is so constructed as to linearly contact the adjacent balls 35, 35 at the outer edges or at the portions vicinal to the outer edges, and the ball 35 is thereby easy to stabilize.

As shown, in FIG. 17, each central portion 40 is substantially perpendicular to a line connecting the centers Y, Y, of the adjacent balls 35, 35.

Figure 18:
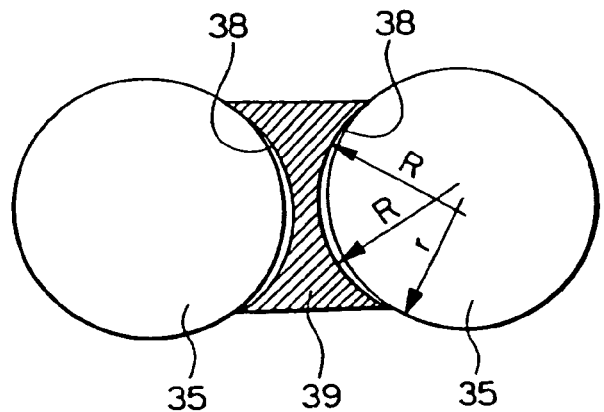
FIG. 18 is an enlarged sectional view showing the balls installed in the linear guide in a second modification of the fourth embodiment of the present invention, and the spacer interposed between the balls.

FIG. 18 is a sectional view of the ball and the spacer, showing a second modification of the fourth embodiment of the present invention. The spacer 39 formed with the two concave surfaces 38, 38 facing respectively to the adjacent balls 35, 35, is disposed between the balls 35, 35. The section of the concave surface 38 is, as in the discussion on the first embodiment, formed of the two circular arcs of which central positions deviate from each other to form a Gothic arch.

With this configuration, as in the first embodiment, the ball 35 is allowed to contact the concave surface 38 of the spacer 39 with an extremely low friction, thereby making it feasible to reduce the slide resistance between the these balls 35 and the spacer 39 and at the same time facilitate the stabilization of the balls 35. Consequently, the spacer 39 comes to have a high circulative characteristic, and it is possible to restrain the decline of the operability, which might be caused by the impingement between the balls 35, 35, and remarkably restrain the balls 35 from being damaged by the friction. There is also no possibility of inducing fluctuations in torque, fluctuations in kinetic friction and the noise problem as well.

Figure 19:
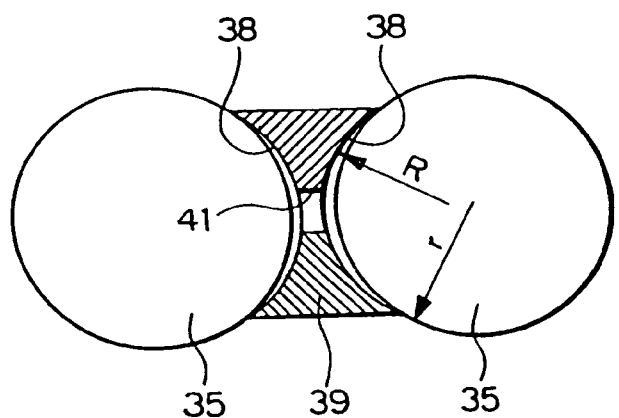
FIG. 19 is an enlarged sectional view showing the balls installed in the linear guide in a third modification of the fourth embodiment of the present invention, and the spacer interposed between the balls.
Figure 20:
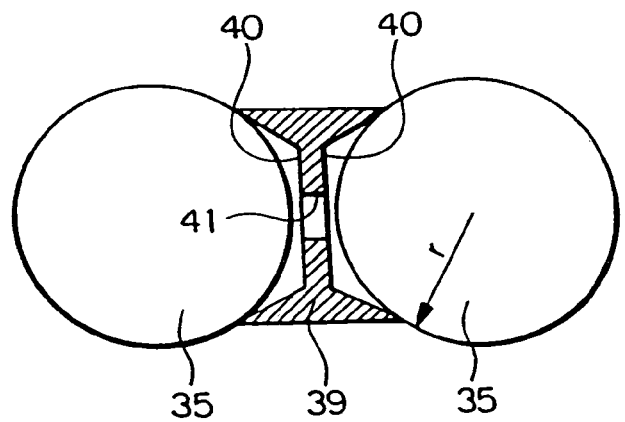
FIG. 20 is an enlarged sectional view showing the balls installed in the linear guide in a fourth modification of the fourth embodiment of the present invention, and the spacer interposed between the balls.
Figure 21:
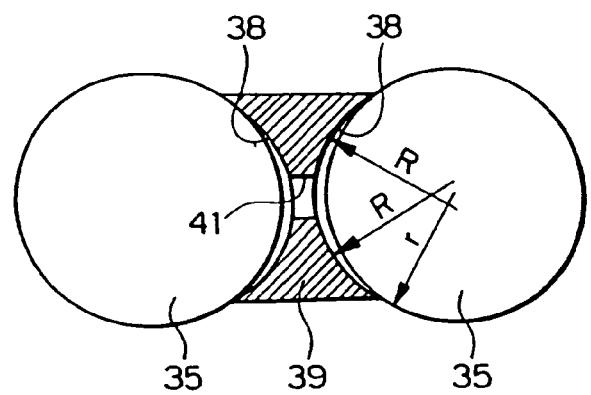
FIG. 21 is an enlarged sectional view showing the balls installed in the linear guide in a fifth modification of the fourth embodiment of the present invention, and the spacer interposed between the balls.

FIGS. 19, 20 and 21 are sectional views of the balls and the spacers, showing third, fourth and fifth modifications of the fourth embodiment of the present invention.

In the third, fourth and fifth modifications, a through-hole 41 is formed in the central portion of each of the spacers 39 in the first and second modifications of the fourth embodiment. For example, if the through-hole 41 contains the lubricating agent such as the lubricating grease and the oleo-resin etc, a retainability thereof is enhanced. The lubricating agent serves to make much smaller the slide resistance between the balls 35 and the spacer 39, and the friction therebetween can thereby be remarkably reduced, and the spacer 39 can exhibit a higher circulative characteristic.

Figure 22:
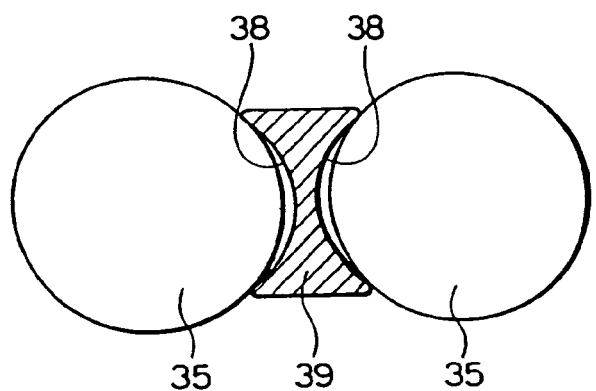
FIG. 22 is an enlarged sectional view showing the balls installed in the linear guide in a sixth modification of the fourth embodiment of the present invention, and the spacer interposed between the balls.
Figure 23:
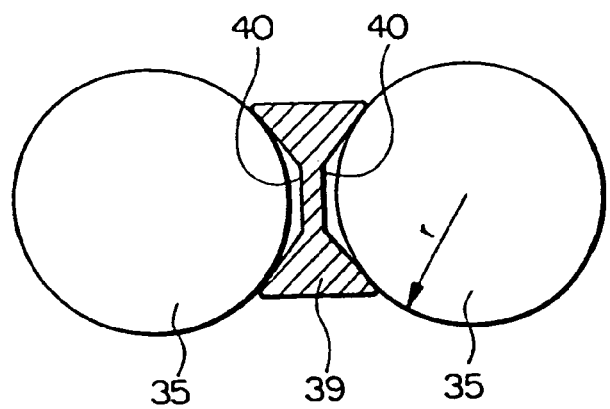
FIG. 23 is an enlarged sectional view showing the balls installed in the linear guide in a seventh modification of the fourth embodiment of the present invention, and the spacer interposed between the balls.

FIGS. 22 and 23 are sectional views of the balls and the spacers, showing sixth and seventh modifications of the fourth embodiment of the present invention.

The sixth and seventh modifications have such a construction that in the first and second modifications described above the outer edges of the spacer 39 are chamfered, and the balls 35 come into contact with the portions vicinal to the outer edges of the spacer 39. In this case too, the balls 35 are easy to stabilize. Further, a durability of the spacer 39 is improved by restraining an abrasion and a fatigue of the concave surface of the spacer 39, with which the balls 35 are bought into contact.

Incidentally, other than the sixth and seventh modifications, the outer edges of the spacer 39 with which the balls 35 come into contact are each formed in an edge-like shape but may be C-chamfered or R-chamfered, for instance. Furthermore, the spacers in the sixth and seventh modifications of the fourth embodiment are all integrally formed.

Fifth Embodiment

Figures 24A, 24B:
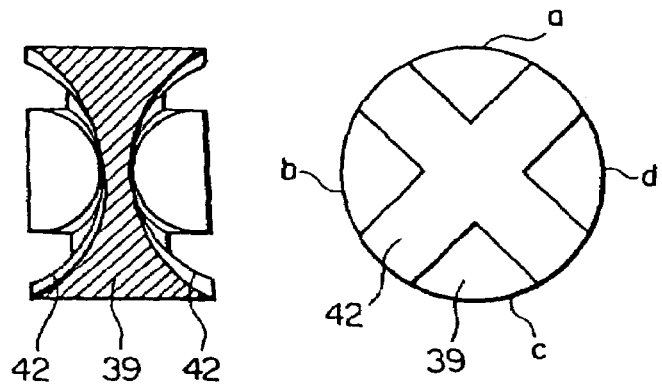
FIG. 24A is a sectional view showing the spacer installed in the linear guide in a fifth embodiment of the present invention.
FIG. 24B is a side view of the spacer shown in FIG. 24A.

FIG. 24A is a sectional view showing the spacer installed in the linear guide in a fifth embodiment of the present invention. FIG. 24B is a side view of this spacer.

As illustrated in FIGS. 24A and 24B, in accordance with the fifth embodiment, cross-grooves 42 are formed in two side surfaces of the spacer 39 as shown in FIG. 16, and outer edge portions a, b, c, d are disposed equally along four corners of the intersection of the cross-groove 42. Accordingly, the balls 35 are capable of contacting the outer edge portions a, b, c, d equally disposed along the four corners and therefore contacting the spacer 39 with an extremely low friction. It is therefore feasible to enhance the circulative characteristic of the balls 35 and of the spacer 39 by reducing the slide resistance between the balls 35 and the spacer 39.

Further, the lubricating agent can be taken in between the spacer 39 and the balls 35 through the cross-groove 42, and the slide resistance between the balls 35 and the spacer 39 can be made much smaller.

Note that the fifth embodiment may also be modified in a variety of forms. For example, the outer edge portions a, b, with which the balls 35 are brought into contact, are not necessarily equally disposed in the four locations but may be disposed in at least three or more locations. Moreover, the portion with which the ball 35 comes into contact is not necessarily the outer edge but may be the portion vicinal to the outer edge. Further, if capable of making a contact area as small as possible and besides stably retaining the balls 35, the concave surface of the spacer 39 may be provided with the ball contact portions in any three or more positions. Still further, the edges of the spacer 39, with which the balls 35 are bought into contact, are formed in the edge-like shape but may be C-chamfered or R-chamfered.

Sixth Embodiment

Figure 25:
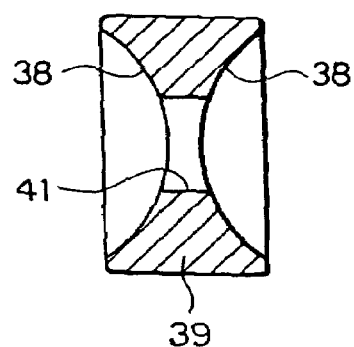
FIG. 25 is a sectional view showing the spacer installed in the linear guide in the sixth embodiment of the present invention.

FIG. 25 is a sectional view showing the spacer installed in the linear guide in a sixth embodiment of the present invention.

As illustrated in FIG. 25, in the sixth embodiment, the spacer 39 is formed with the two concave surfaces 38, 38 to face adjacent balls 35, 35, when disposed between the balls 35. The spacer 39 has a through-hole 41 formed in a thinnest-portion between the two concave surfaces 38. Accordingly, the contact area of the spacer 39 with the balls 35 is further reduced due to the through-hole 41 of the spacer 39, and it is possible to remarkably decrease the fluctuations both in torque and in kinetic friction. At the same time, since the through-hole 41 is formed in the minimum-thickness portion between the concave surfaces 38, there is an advantage of minimizing an influence upon the strength thereof.

Figure 26:
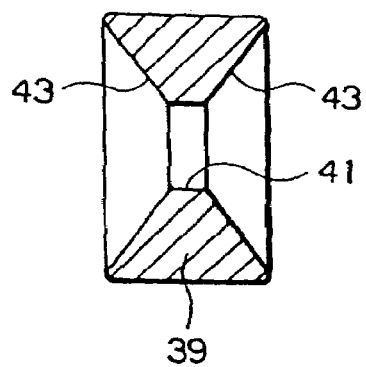
FIG. 26 is a sectional view showing the spacer installed in the linear guide in a modification of the sixth embodiment of the present invention.

FIG. 26 is a sectional view of the spacer installed in the linear guide, showing a modification of the sixth embodiment of the present invention.

In this modification, recesses 43, 43 each taking approximately a trapezoidal shape are formed instead of the concave surfaces 38 in both side surfaces of the spacer 39. The through hole 41 is formed in a thinnest portion of the spacer 39. Accordingly, in this case too, it is feasible to remarkably decrease both the contact area of the spacer with the ball 35 and the influence upon the strength thereof.

Note that the sixth embodiment may also be modified in many forms.

Further, examples and comparative examples of the sixth embodiment will be explained later on.

EXAMPLES

Examples and comparative examples of the second embodiment discussed above are carried out in a way which follows.

Examples of Second Embodiment

By way of an example of the second embodiment, there is prepared the ball screw device in which the spacer (a retaining piece) having a diameter ds of 5.6 mm is inserted, wherein as shown in Table 1 the charging rate is set at 99.0%, the spacing (S1) of the above-mentioned total gap is set to 3.6 mm, the spacing (S2) of the gap is set to 4.4 mm, and a ratio S2/ds is set at 0.79.

TABLE 1

Figure 27:
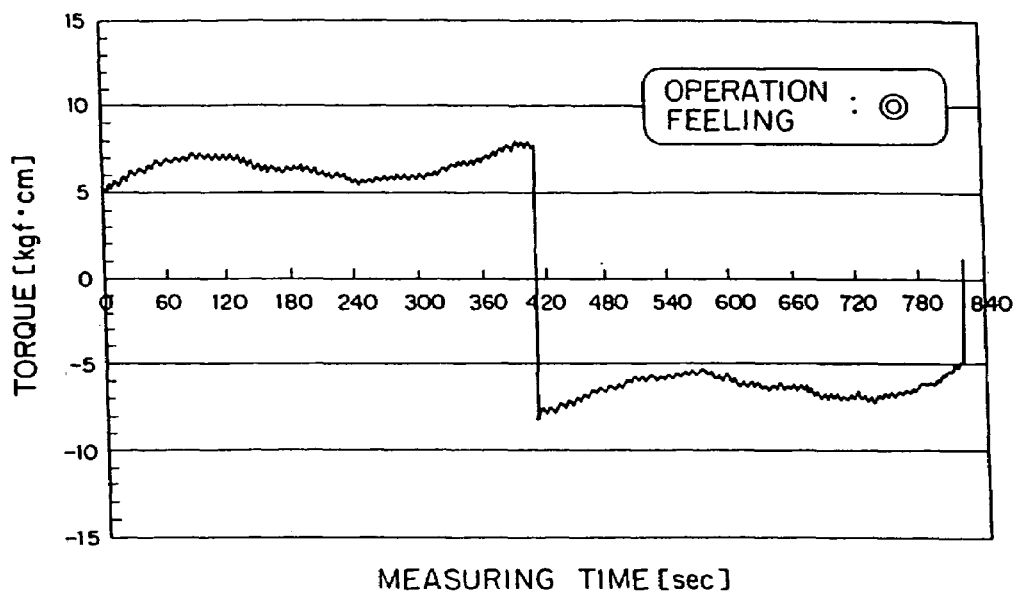
FIG. 27 is a graph showing a result of a test in an example of the second embodiment of the present invention.
Figure 28:
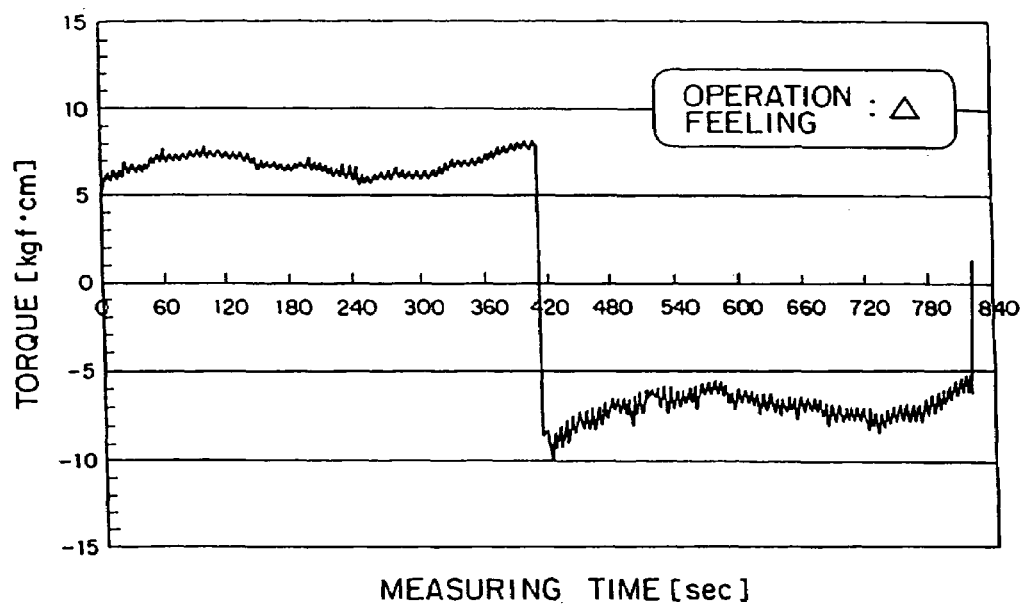
FIG. 28 is a graph showing a result of the test in a comparative example 1 of the second embodiment of the present invention.
Figure 29:
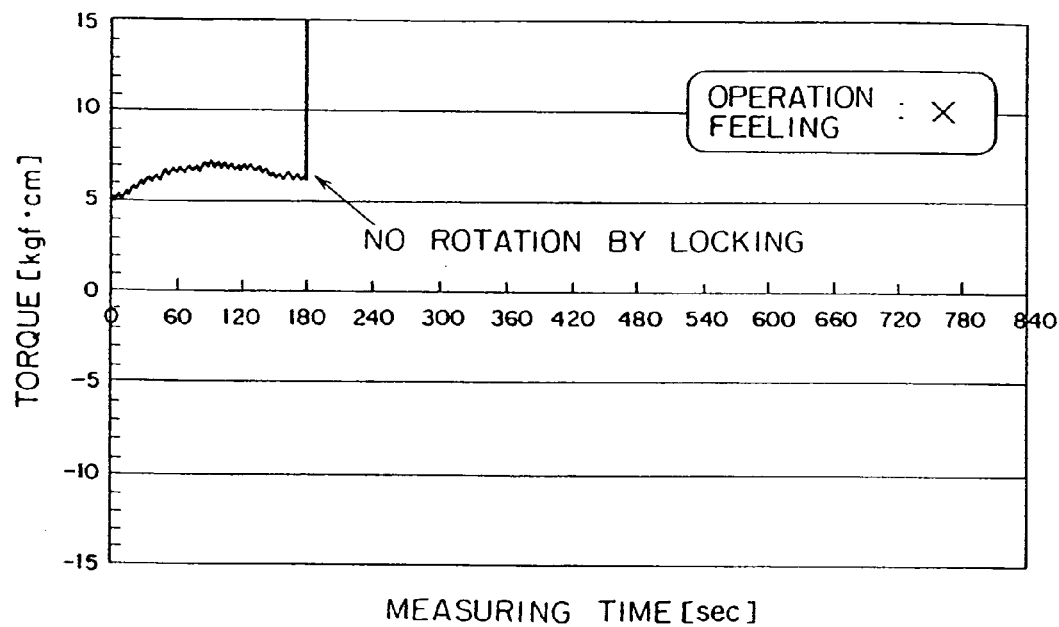
FIG. 29 is a graph showing a result of the test in a comparative example 2 of the second embodiment of the present invention.
Figure 30:
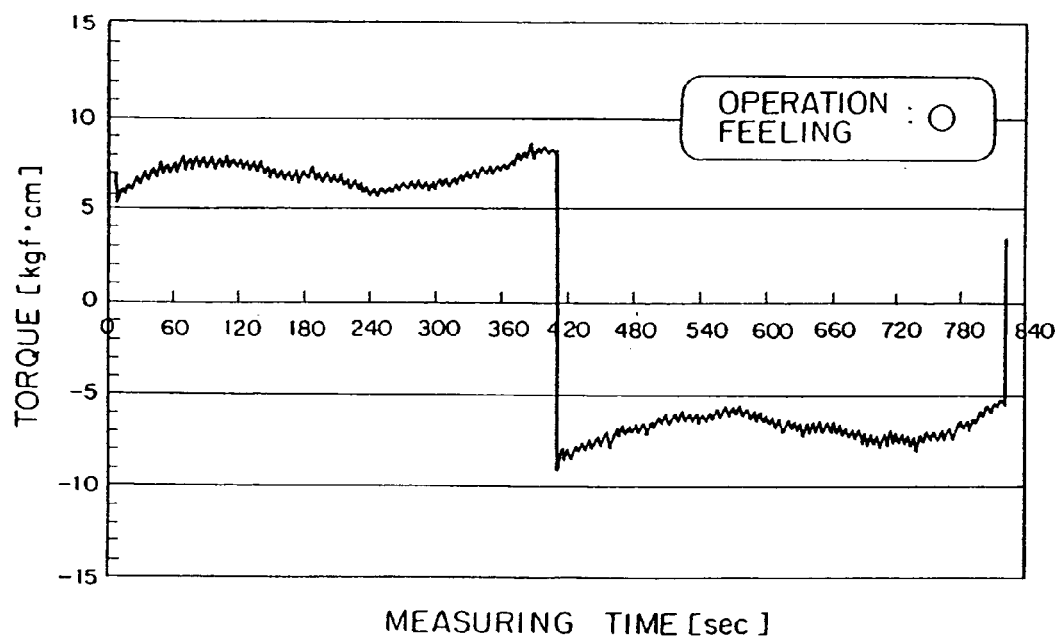
FIG. 30 is a graph showing a result of the test in a comparative example 3 of the second embodiment of the present invention.

| | Classification | Charging Rate [%] | Clearance quantity [mm] S2 (S2/ds) | S1 | Operability Torque data | Feeling |
|---|---|---|---|---|---|---|
| Example | Retaining piece | 99.0 | 4.4 (0.79) | 3.6 | FIG. 27 | ⊚ |
| Comparative example 1 | Same as above | 100.6 | 0.8 (0.14) | 0 or under | FIG. 28 | Δ |
| Comparative example 2 | Same as above | 97.3 | 11.5 (2.1) | 10.7 | FIG. 29 | X (lock) |
| Comparative example 3 | Conventional member (all balls) | 98.5 | — | — | FIG. 30 | ○ |

FIG. 27 shows a test result of this example.

The fluctuation in torque is extremely small, and it is therefore confirmed that the operation condition is good.

Comparative Example 1 of Second Embodiment

By way of a comparative example 1, there is prepared the ball screw device in which the spacer (the retaining piece) is inserted, wherein as shown in Table 1 the charging rate is set at 100.6%, the spacing (S1) of the above-mentioned total gap is set to 0 or under, the spacing (S2) of the gap is set to 0.8 mm, and the ratio S2/ds is set at 0.14. FIG. 28 shows a test result of this comparative example 1. The total gap etc is set too small, and hence the fluctuation in torque is larger than in the case of the above example (FIG. 27), and it is confirmed that the operation condition is not so good.

Comparative Example 2 of Second Embodiment

By way of a comparative example 2, there is prepared the ball screw device in which the spacer (the retaining piece) is inserted, wherein as shown in Table 1 the charging rate is set at 97.3%, the spacing (S1) of the above-mentioned total gap is set to 10.7 mm, the spacing (S2) of the gap is set to 11.5 mm, and the ratio S2/ds is set at 2.1.

FIG. 29 shows a test result of this comparative example 2. An initial operation is well done, however, the total gap etc is set too large, and hence the good operation condition is unable to be kept during the stroke, resulting in a locked state.

Comparative Example 3 of Second Embodiment

By way of a comparative example 3, the ball screw device which does not use the spacer is prepared, as shown in Table 1, the charging rate is set at 96.5%.

FIG. 30 shows a test result of the comparative example 3. The fluctuation in torque is slightly larger than in the case of the above example (FIG. 27), and it is confirmed that the operation condition is comparatively good but is inferior to the example (FIG. 27).

Next, examples and comparative examples of the sixth embodiment will be given.

Examples and Comparative Examples of Sixth Embodiment

Figure 31:
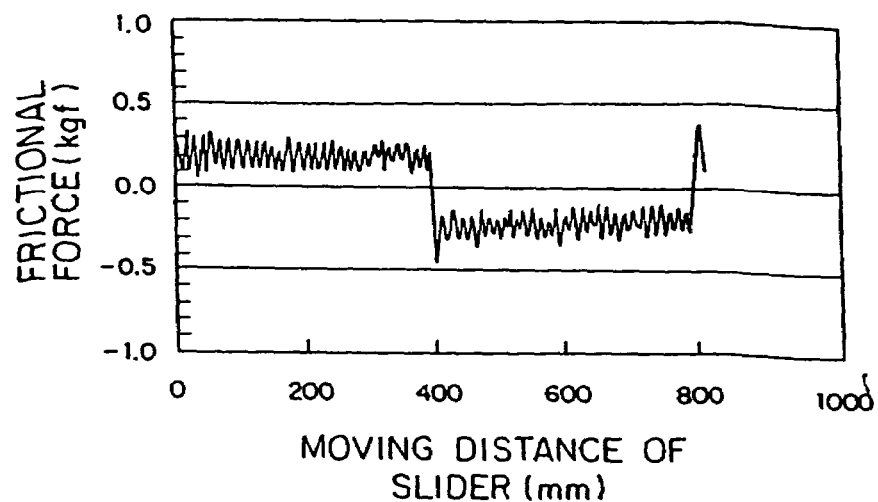
FIG. 31 is a graph showing a result of the test in an example of the sixth embodiment of the present invention.
Figure 32:
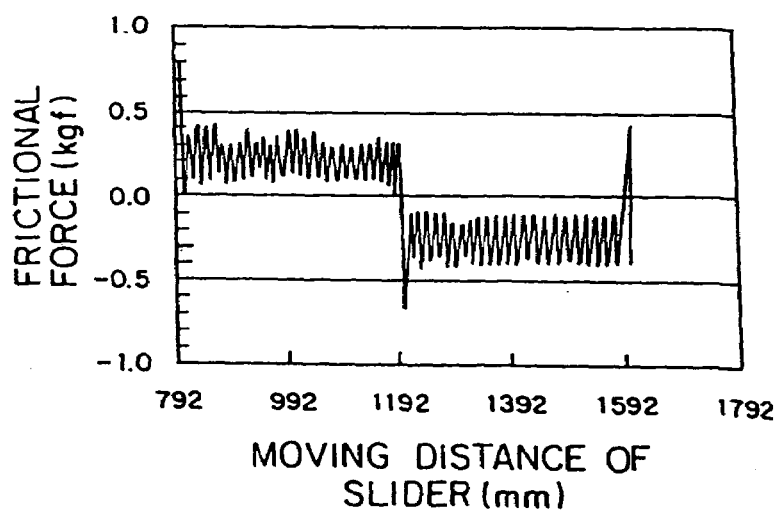
FIG. 32 is a graph showing a result of the test in a comparative example of the sixth embodiment of the present invention.
Figure 33:
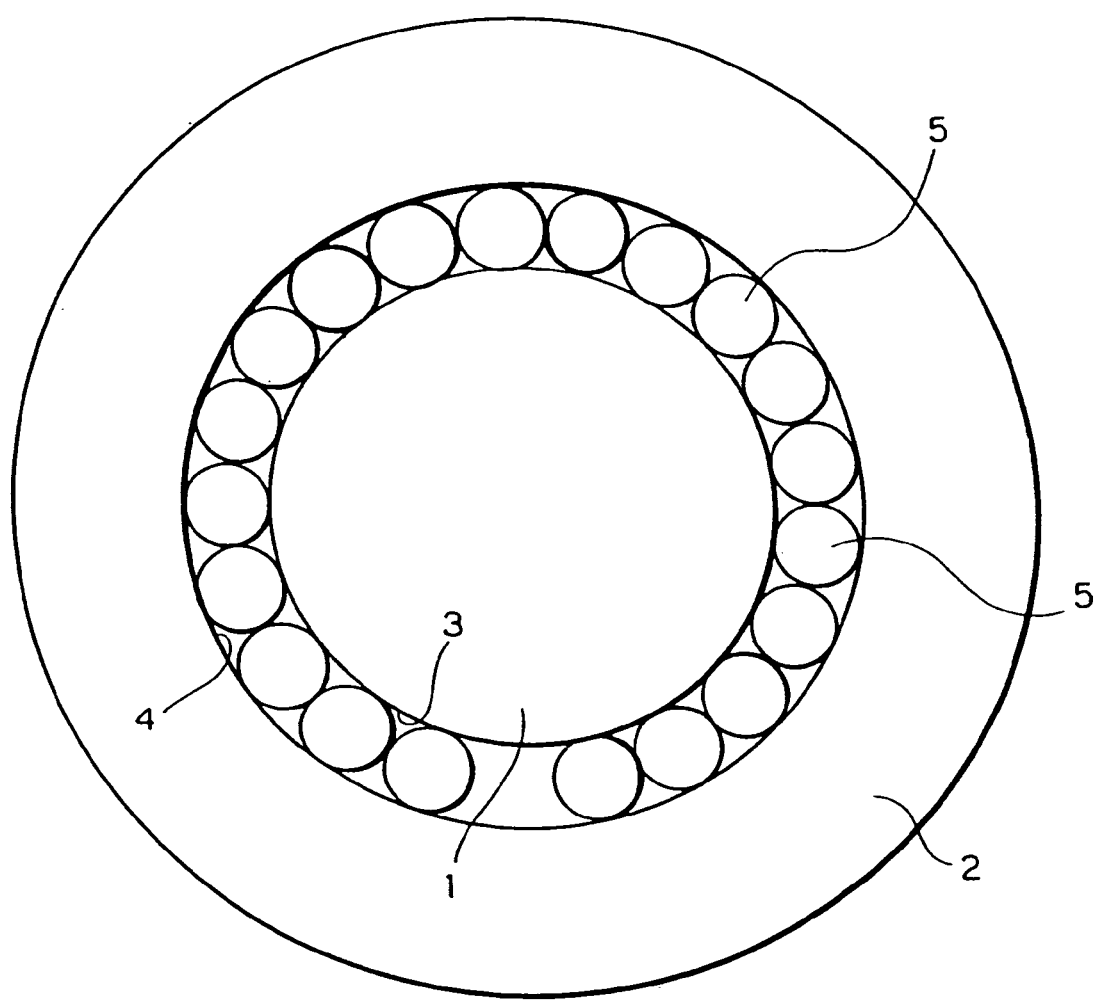
FIG. 33 is a side view showing a ball screw device in the prior art.

As shown in FIG. 31, there is measured a kinetic frictional force, wherein the spacer is formed with the through-hole in the example. As shown in FIG. 32, there is measured a kinetic frictional force, wherein the spacer is not formed with the through-hole in the comparative example. It is confirmed that the fluctuation in kinetic friction force is far smaller in the example (FIG. 31) than in the comparative example (FIG. 32).

Note that some of the spacers in the examples given above have been exemplified as having the shape of the Gothic arch in section. However, the sectional configuration is not limited to the Gothic arch and may embrace applications of, e.g., a single R-shape and a V-shape as well.

As discussed above, in a preferred ball screw device of the present invention, the spacer having the two concave surfaces facing respectively to adjacent balls, is disposed between the balls adjacent to each other, and the section of each of the concave surfaces of the spacer is formed of the two circular arcs of which central positions deviate from each other to form a Gothic arch shape. In this case, the load balls are bought into linear- or point-contact with the concave surfaces of the spacer formed of the circular arcs each taking the Gothic arch configuration, and can be therefore circulated along within the helical screw grooves while contacting the concave surfaces with an extremely low friction. Accordingly, the friction between the load balls and the spacer is small, and the spacer comes to have the high circulative characteristic. It is also feasible to prevent the decline of the operability which might be caused by the impingement between the balls, and also frictional damage to the balls. Also, the configuration of the spacer can be made smaller than the conventional spacer ball, and consequently it never happens that the decreases in the load capacity and in the rigidity are induced with a restraint of reducing the number of the load balls.

Furthermore, in the ball screw device of the present invention, the total gap in the circulation path is set larger than zero, and besides, when the single spacer is eliminated, the spacing of the gap between the leading ball and the tailing ball is set in the above relationship in terms of the numerical values. In this case, the spacer is not skewed within the circulation path because of the gap in the circulation path being too large, and it never happens that there is induced the operation deterioration due to the friction between the balls and the spacer because of the gap in the circulation path being too small. The gap in the circulation path is properly set, and therefore the spacer is not skewed at approximately 60° or larger, whereby the good operability can be maintained.

Moreover, in the ball screw device of the present invention, the spacer may be so constructed as to be elastically deformable between the balls adjacent to each other, in which case the inter-ball distance can be controlled by making the spacer elastically deformed. Accordingly, the charging rate of the balls and the spacer with respect to the circuit length can be extremely easily set to a proper value. For example, the charging rate can be controlled by the one type of integrally formed less expensive spacers, which eliminates the necessity for such a complicated design work as to manufacture several types of spacers for a trial and combine those spacers in many ways. Further, the charging rate may be set at 100% (i.e., the spacing between the ball and the spacer is set to zero) as the necessity may arise. Note that the spacer may be elastically deformed in terms of its structure as in the case of the slit 21 described above, or may also be elastically deformed based on only the material itself.

Moreover, in the linear motion device of the present invention, the spacer may take such a configuration that the balls adjacent to each other come into contact with the outer edges or the portions vicinal to the outer edges. In this case, the spacer is capable of retaining the balls with much wider areas, and it is feasible to take a still larger retaining allowance for the spacer to retain the balls. Further, the ball is easy to stabilize, and the measurement of the dimension (i.e., the thickness of the spacer) between the balls is facilitated. It is therefore possible to manufacture the spacer exhibiting a high accuracy.

As discussed above, in the linear motion device of the present invention, the spacer is interposed between the balls and has the concave surfaces with which the adjacent balls are bought into linear contact. In this case, the friction between the balls and the spacer is small, and the spacer has the good circulative characteristic. It is also feasible to prevent the deterioration of the operability, the occurrence of noises due to the impingement between the balls and a deteriorated quality of sound produced, and also frictional damage to the balls.

Moreover, in the linear motion device according to the present invention, the balls adjacent to each other may come into contact with at least three or more portions of the spacer, and are therefore capable of contacting the spacer with an extremely small friction. The friction therebetween can be minimized by reducing the slide resistance between the balls and the spacer, and the circulative characteristic of the spacer and the balls is enhanced. At the same time, the stabilization of the balls is facilitated, and the lubricating agent can be easily led into the spacer, thereby making much smaller the slide resistance between the balls and the spacer.

Further, in the linear motion device of the present invention, the spacer has the through-hole formed in the thinnest portion thereof, in which case it is feasible to remarkably decrease the fluctuation in kinetic friction force with the further diminished contact area between the ball and the spacer owing to the through-hole of the spacer. At the same time, there is an advantage that the influence upon the strength is decreased because of the through-hole being formed in the thinnest portion between the concave surfaces.

The present invention has been discussed by way of the embodiments but may be modified in many forms within the range of the gist of the present invention, and these modifications are not excluded from the scope of the present invention.

What is claimed is:

1. A linear motion device comprising:
an outer member;
an inner member facing said outer member via a gap;
a multiplicity of balls disposed between said outer member and said inner member; and
a plurality of spacers;
said outer member being linearly movable relative to said inner member;
each spacer being disposed between two adjacent balls and having two concave surfaces facing respectively to said two balls; and
each concave surface of at least one spacer being configured such that, as viewed in an axial direction of the spacer, the concave surface makes substantially circular line contact with the facing adjacent ball;
said spacers include spacers having different widths such that distances between the balls separated by the respective spacers are different depending on said widths.

2. A linear motion device comprising:
an outer member;
an inner member facing said outer member via a gap;

a multiplicity of balls disposed between said outer member and said inner member; and plural forms of spacers differing in width, the number of said forms being less than the number of spacers;

said outer member being linearly movable relative to said inner member;

each spacer being disposed between two adjacent balls and having two concave surfaces facing respectively to said two balls; and each concave surface of at least one spacer being configured such that, as viewed in an axial direction of the spacer, the concave surface makes substantially circular line contact with the facing adjacent ball;

distances between the balls separated by the respective spacers being different depending on said forms of the spacers.

3. A liner motion device according to claim 1, wherein when all said balls and all said spacers are converged to be in successive contact, a total gap spacing (S1) formed between a leading ball and a tailing spacer is larger than zero (S1>0) and a distance (S2) between said leading ball and a tailing ball is smaller than a 0.8 times a diameter (ds) of said tailing spacer (S2<0.8×ds).

4. A liner motion device according to claim 2, wherein when all said balls and all said spacers are converged to be in successive contact, a total gap spacing (S1) formed between a leading ball and a tailing spacer is larger than zero (S1>0) and a distance (S2) between said leading ball and a tailing ball is smaller than a 0.8 times a diameter (ds) of said tailing spacer (S2<0.8×ds).

* * * * *